United States Patent
Taylor et al.

(10) Patent No.: US 12,435,958 B2
(45) Date of Patent: Oct. 7, 2025

(54) REAL-TIME SHOT DETECTION AND SCORING BASED ON TARGET IMAGE PROCESSING

(71) Applicant: ELEY Ltd., Sutton Coldfield (GB)

(72) Inventors: Philip Taylor, Sutton Coldfield (GB); Michael Atkinson, Sutton Coldfield (GB); Frederic Sage, Sutton Coldfield (GB)

(73) Assignee: ELEY Ltd., Minworth (GB)

( * ) Notice: Subject to any disclaimer, the term of this patent is extended or adjusted under 35 U.S.C. 154(b) by 281 days.

(21) Appl. No.: 18/135,272

(22) Filed: Apr. 17, 2023

(65) Prior Publication Data

US 2023/0332871 A1    Oct. 19, 2023

Related U.S. Application Data

(60) Provisional application No. 63/332,617, filed on Apr. 19, 2022.

(51) Int. Cl.
*F41J 5/14*    (2006.01)
*F41J 5/10*    (2006.01)

(52) U.S. Cl.
CPC .. *F41J 5/10* (2013.01); *F41J 5/14* (2013.01)

(58) Field of Classification Search
None
See application file for complete search history.

(56) References Cited

U.S. PATENT DOCUMENTS

| | | | | |
|---|---|---|---|---|
| 5,551,876 A | * | 9/1996 | Koresawa | F41G 3/2694 434/11 |
| 6,012,980 A | * | 1/2000 | Yoshida | A63F 13/213 250/221 |
| 6,964,607 B2 | * | 11/2005 | Sasaki | A63F 9/0291 463/2 |
| 8,360,776 B2 | * | 1/2013 | Manard | F41J 5/10 434/23 |

(Continued)

OTHER PUBLICATIONS

International Preliminary Report on Patentability received for PCT Patent Application No. PCT/IB2023/053927 mailed on Oct. 31, 2024, 12 pages.
Chandan et al., "Image Processing based Scoring System for Small Arms Firing in the Military Domain," Proceedings of the 4th International Conference on Image Processing and Machine Vision (IPMV), Jul. 15, 2022, pp. 57-63.

(Continued)

*Primary Examiner* — Sunit Pandya
(74) *Attorney, Agent, or Firm* — Faegre Drinker Biddle & Reath LLP

(57) ABSTRACT

An electronic target measurement system is disclosed such that the system includes image capture device(s), an access point device, and a user device. Each image capture device acquires a series of successive real-time images of at least one target with a plurality of regions of interest (ROIs). The access point device receives the images and transmits the images to a user device. The user device performs image preprocessing on the images, determines via an image differentiation process that a difference exists between the images, extracts the ROIs and locations of impact (LOIs) from the received image, and determines ROI center points, LOIs within the ROIs, and LOI center points. The user device also determines regional scores based on the distances between the ROI center points the LOI center points, and then a total score by adding the regional scores for the plurality of extracted ROIs.

24 Claims, 18 Drawing Sheets

(56) References Cited

U.S. PATENT DOCUMENTS

| | | | |
|---|---|---|---|
| 10,458,758 B2* | 10/2019 | Miller | F41J 5/056 |
| 10,489,932 B2 | 11/2019 | Li et al. | |
| 10,648,781 B1 | 5/2020 | Behiel | |
| 11,079,204 B2 | 8/2021 | Li et al. | |
| 2011/0218021 A1* | 9/2011 | Anderson | A63F 9/24 |
| | | | 463/2 |
| 2016/0298930 A1* | 10/2016 | Squire | F41G 3/2655 |
| 2017/0307341 A1* | 10/2017 | Hollinger | F41J 5/14 |
| 2019/0063884 A1 | 2/2019 | Mcbride et al. | |
| 2020/0184681 A1 | 6/2020 | Li et al. | |

OTHER PUBLICATIONS

International Search Report and Written Opinion received for PCT Patent Application No. PCT/IB2023/053927, mailed on Aug. 2, 2023, 20 pages.

Issa et al., "Automation of Real-time Target Scoring System Based on Image Processing Technique," Journal of Mechanical Engineering Research and Developments, vol. 44, No. 2, Nov. 1, 2021, pp. 316-323.

Rudzinski et al., "Automatic Scoring of Shooting Targets with Tournament Precision," Advances in Knowledge-Based and Intelligent Information and Engineering Systems, vol. 243, Jan. 1, 2012, pp. 324-334.

Widayaka et al., "Automatic Shooting Scoring System Based on Image Processing," Journal of Physics: Conference Series, vol. 1201, Jun. 3, 2019, pp. 012047 (1-9).

* cited by examiner

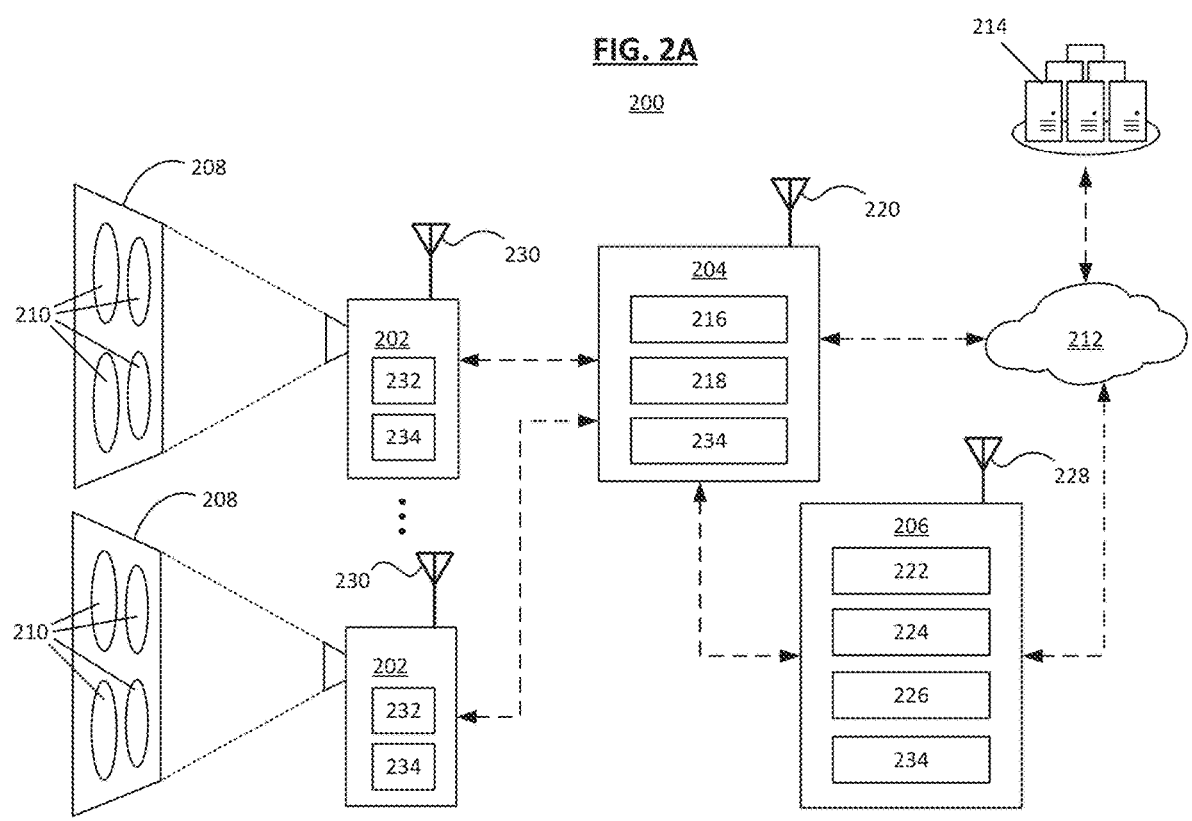

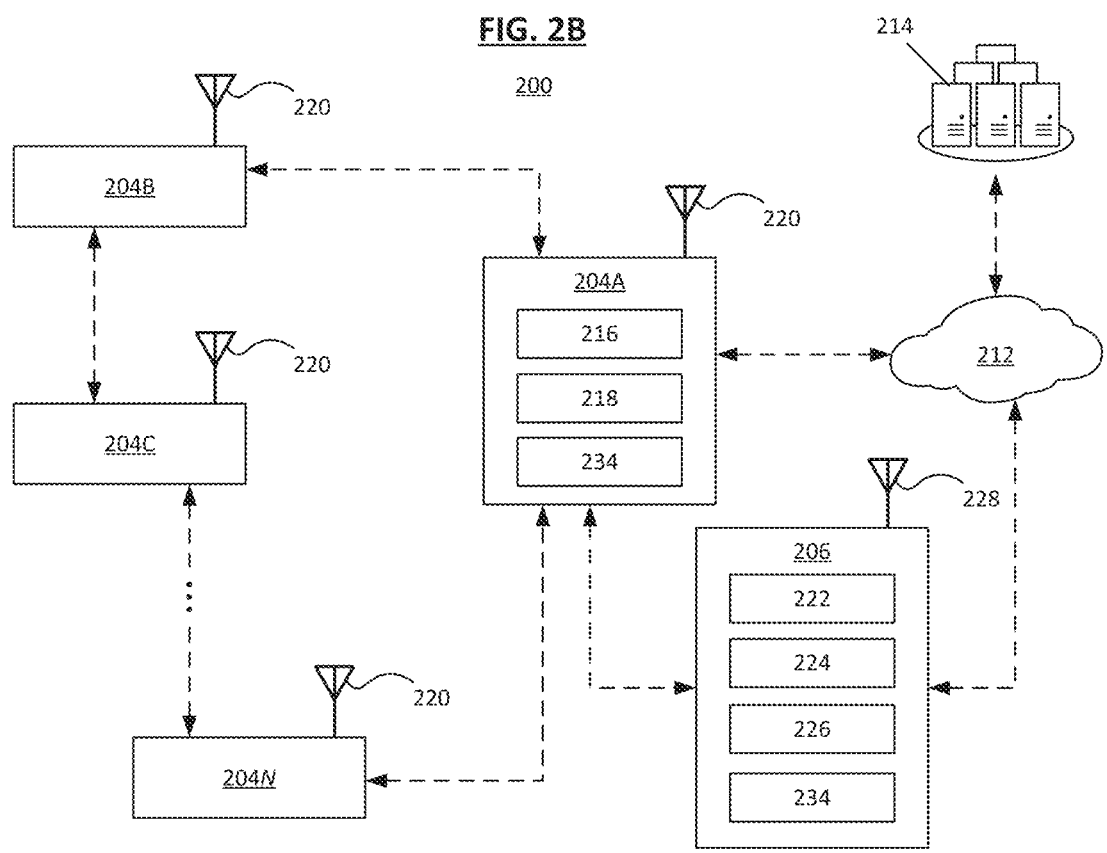

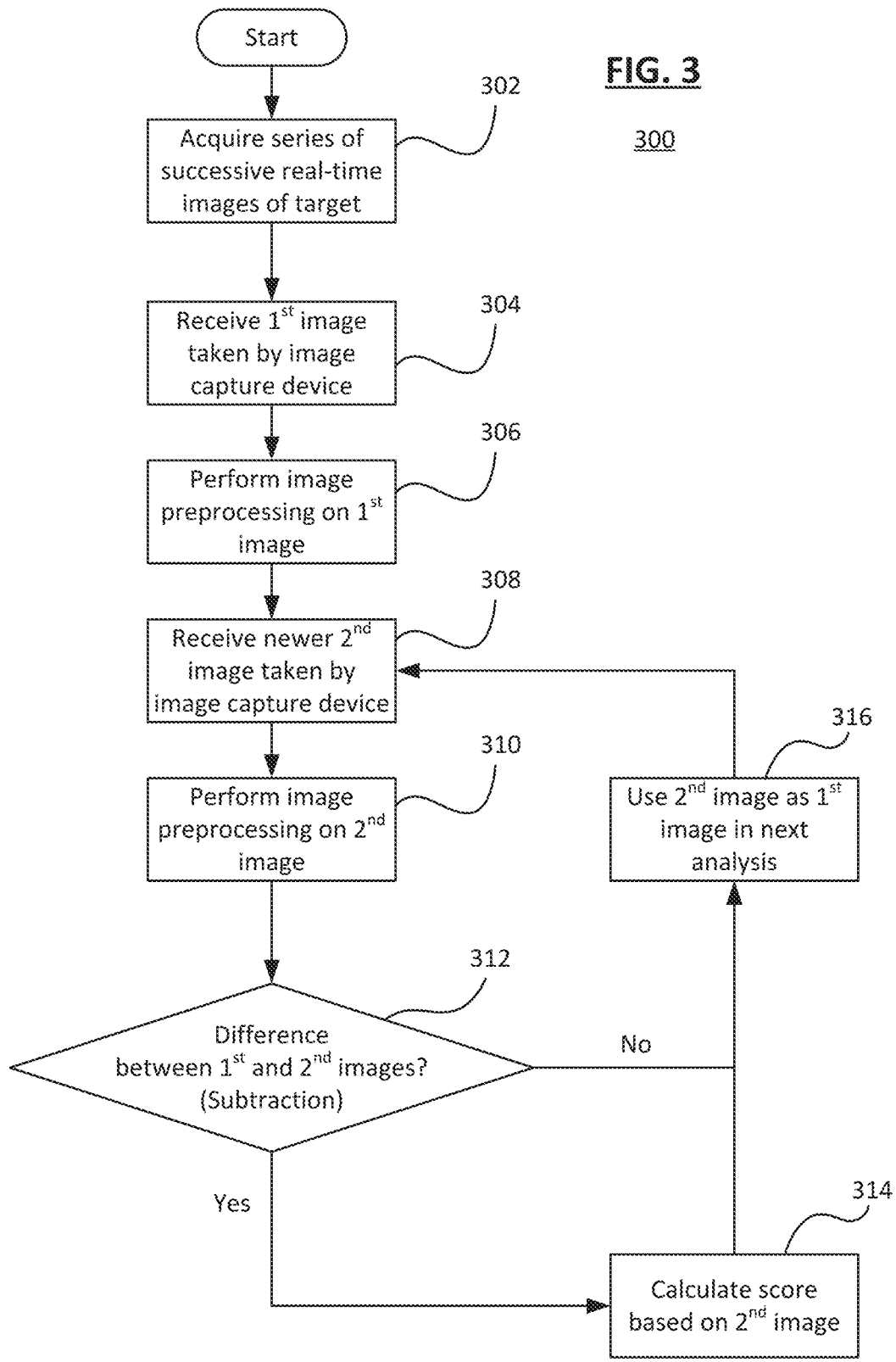

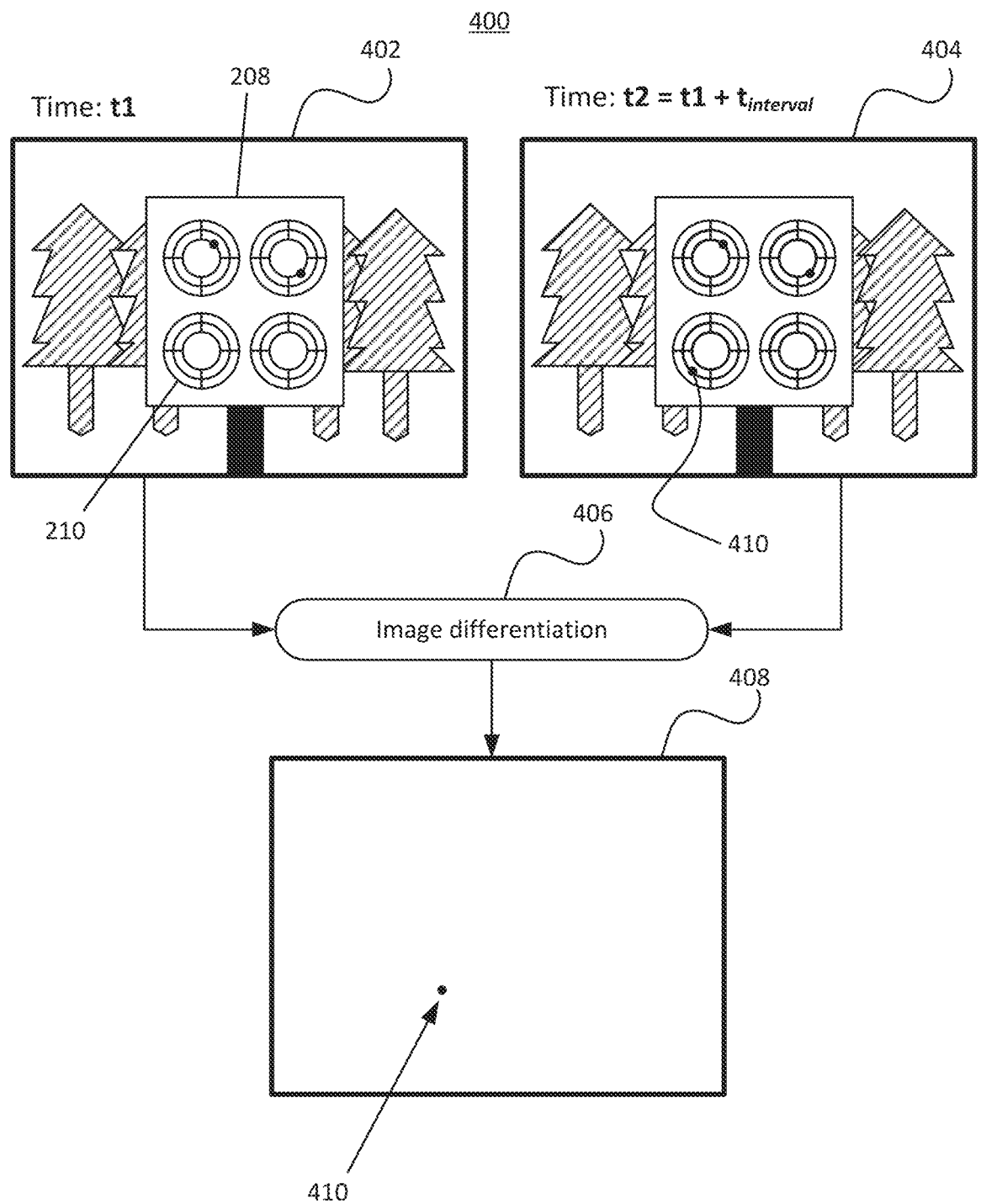

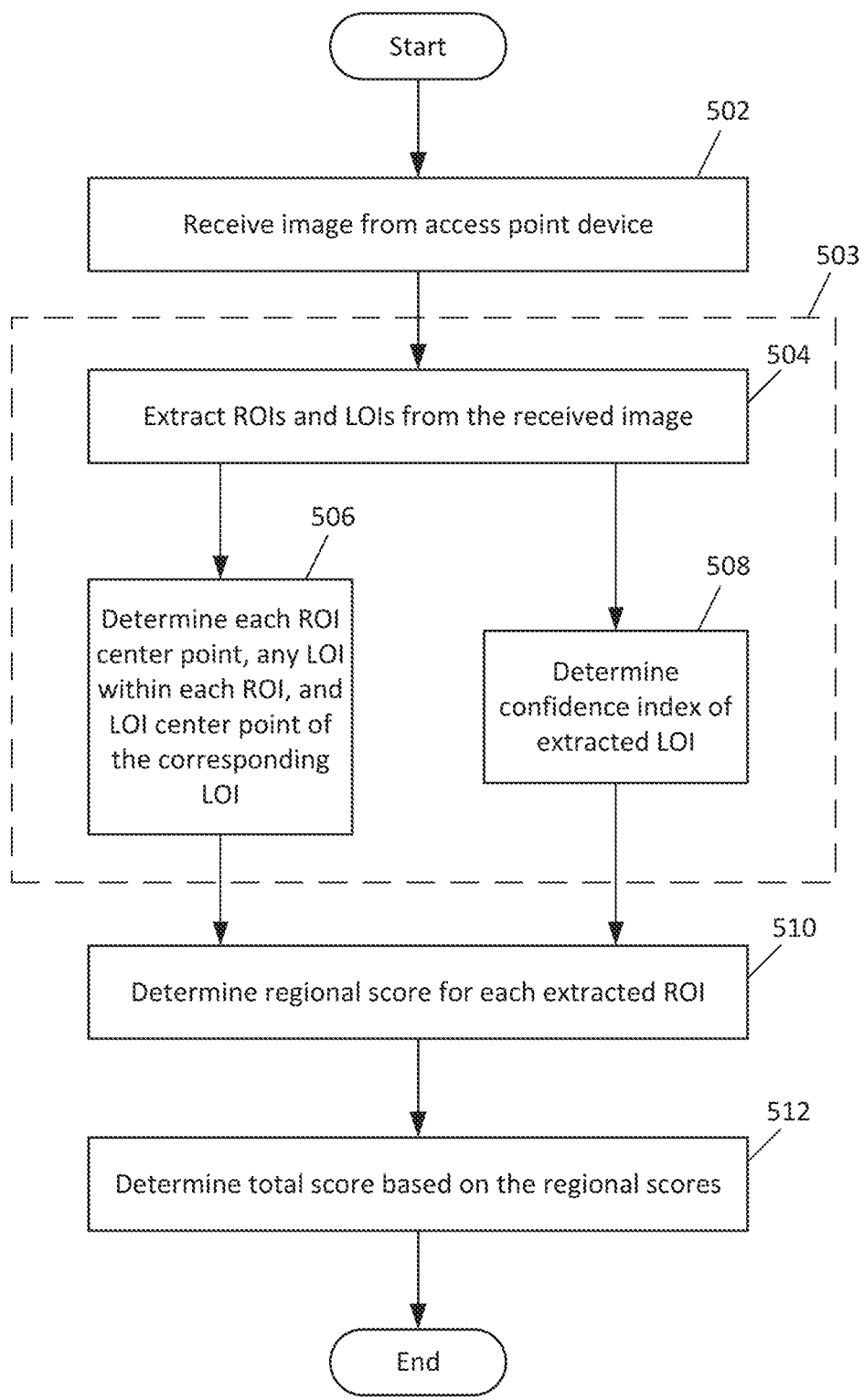

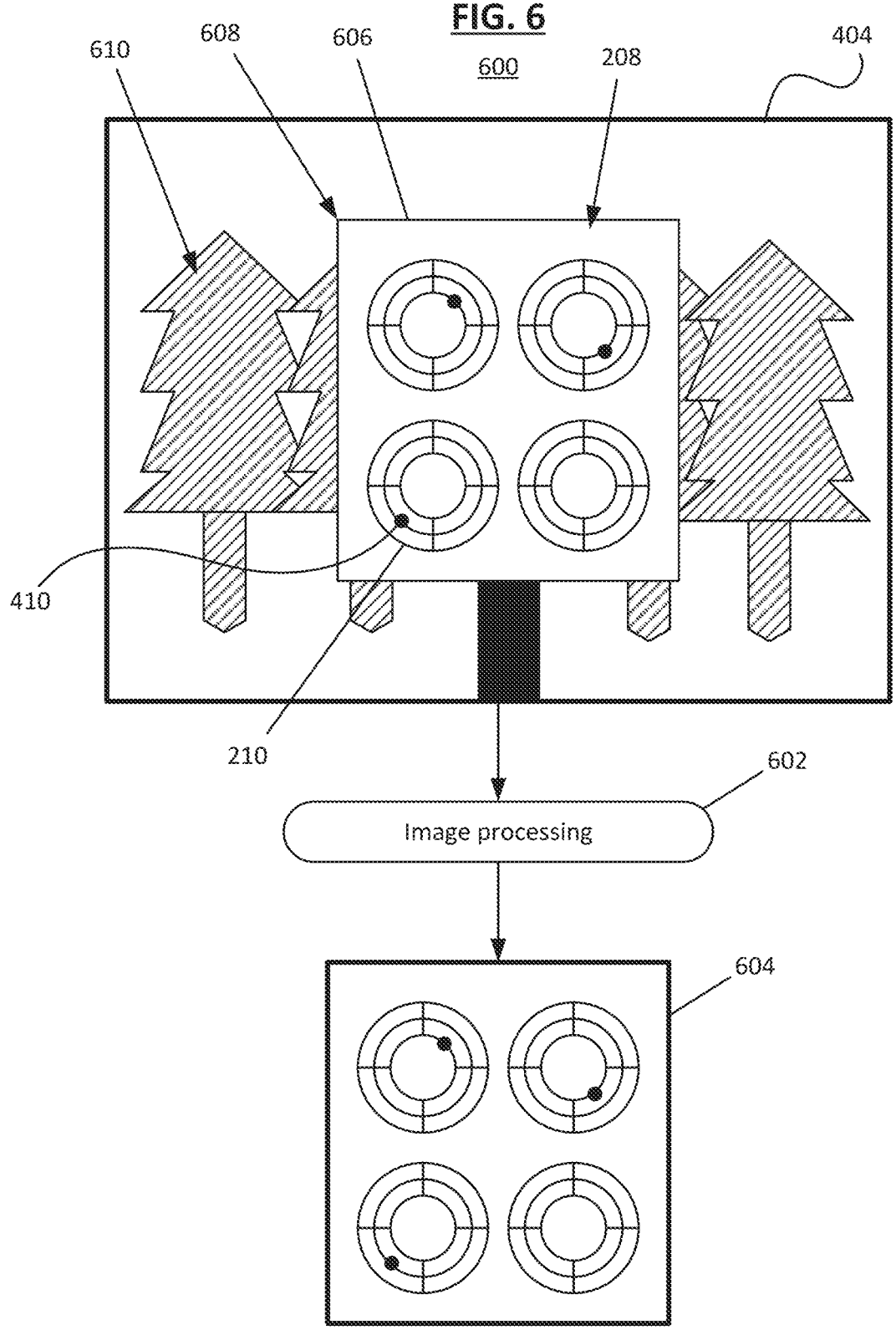

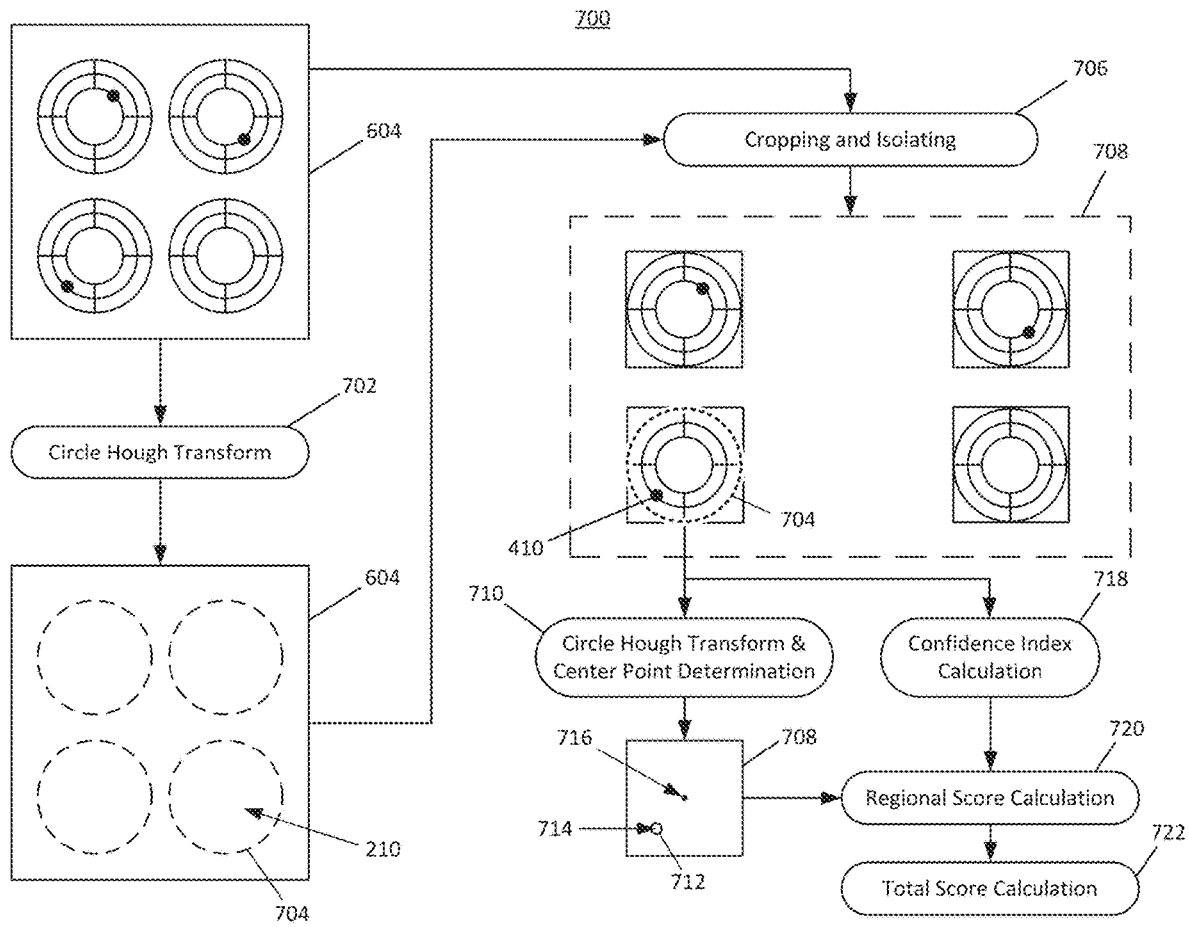

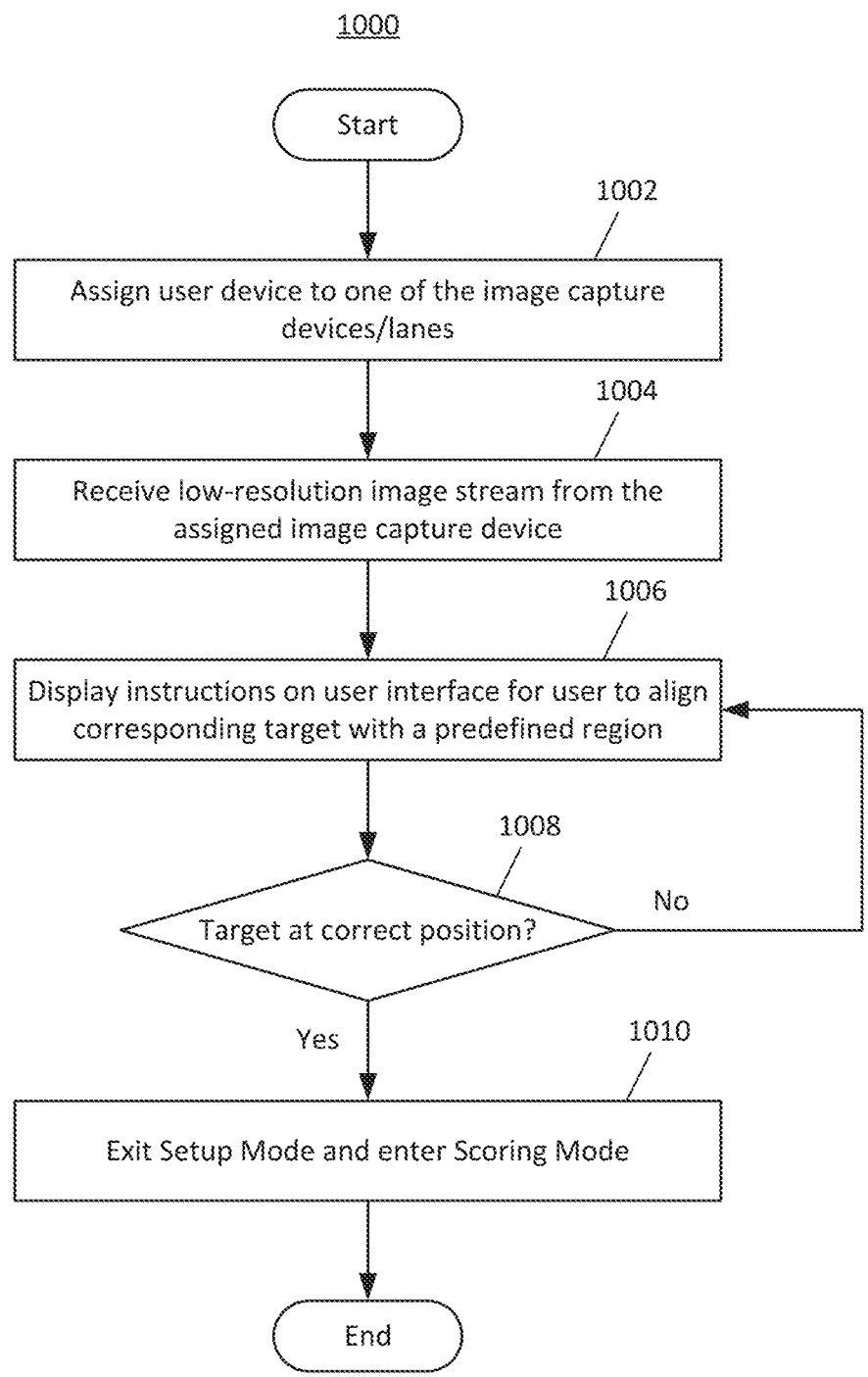

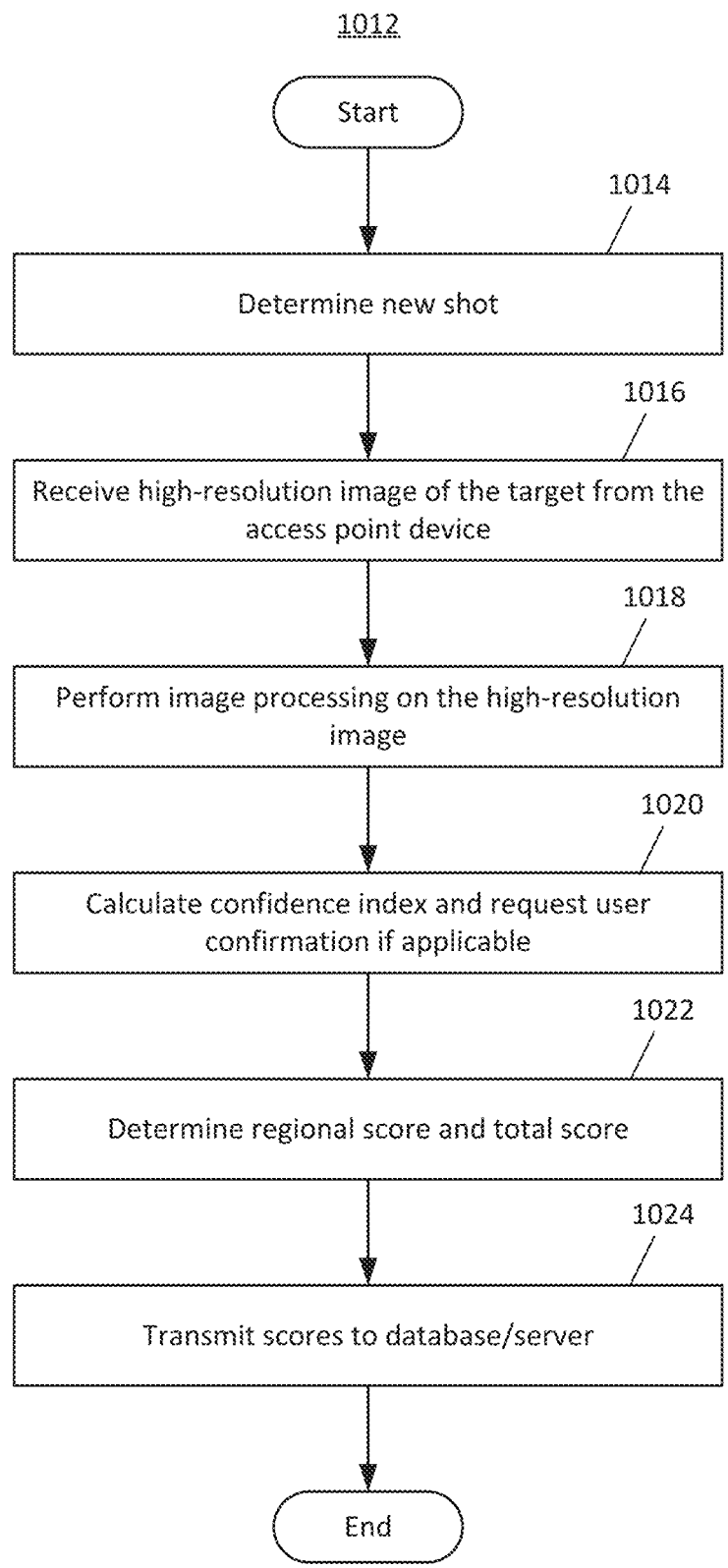

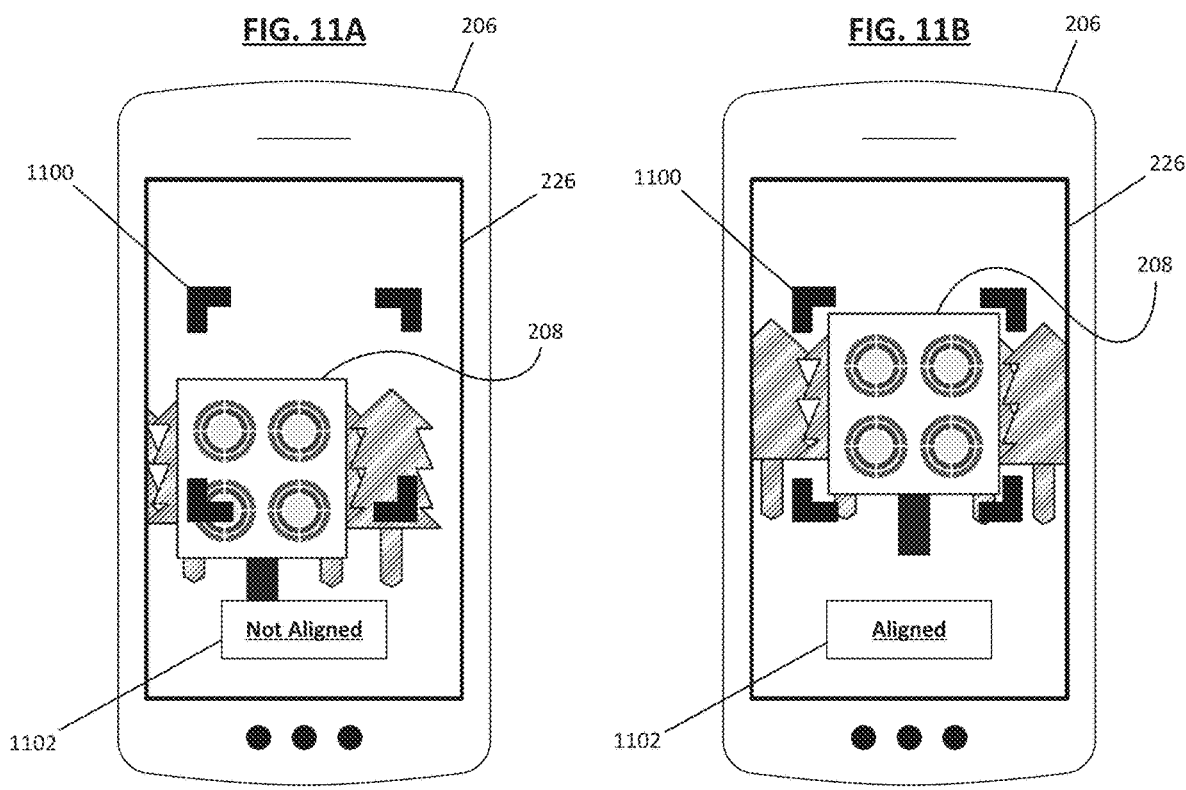

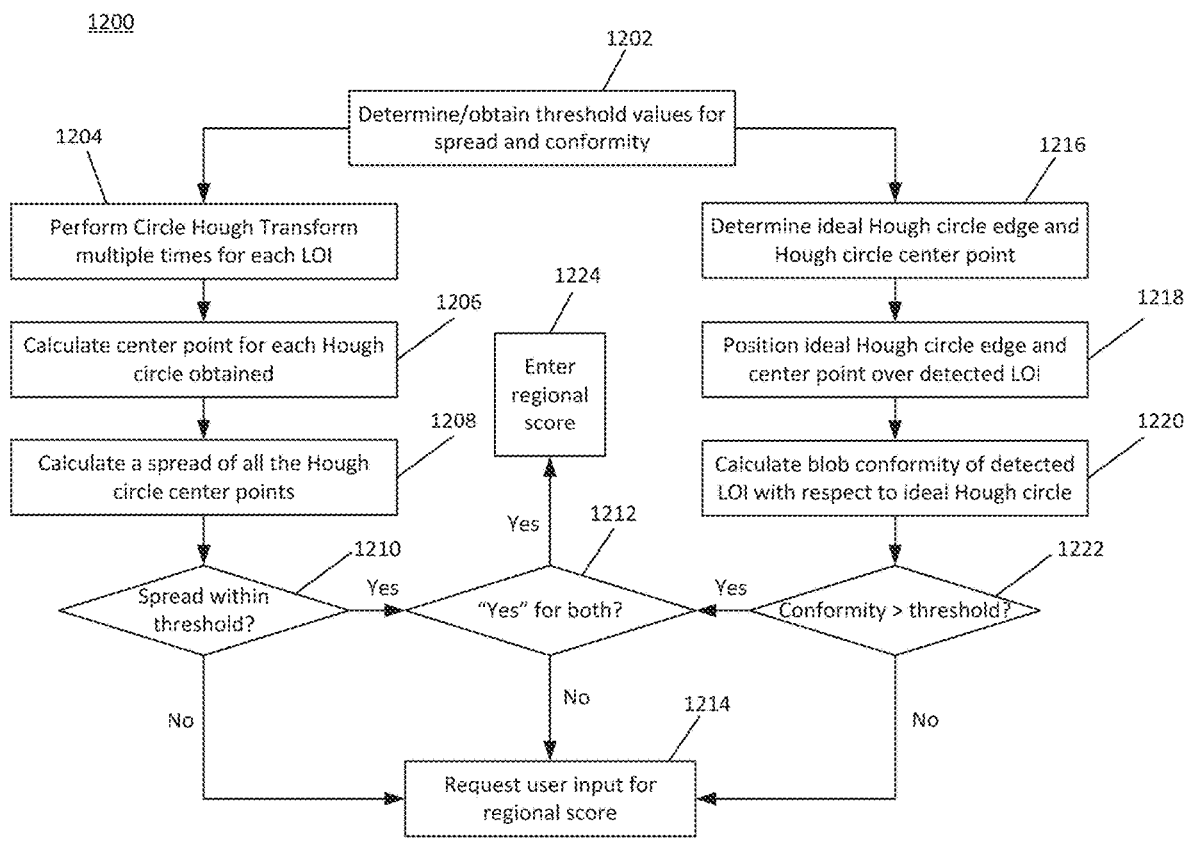

REAL-TIME SHOT DETECTION AND SCORING BASED ON TARGET IMAGE PROCESSING

CROSS-REFERENCE TO RELATED APPLICATION

This application claims the benefit of U.S. Provisional Application No. 63/332,617, filed Apr. 19, 2022, which is incorporated herein by reference in its entirety for all purposes.

FIELD OF THE DISCLOSURE

The present disclosure relates generally to the technical field of image processing, or more specifically to a shot detection and scoring system based on image processing.

BACKGROUND OF THE DISCLOSURE

In a traditional shooting training site, a user shoots at a target paper located at a distance, and the shooting accuracy of the user is analyzed by detecting where each shot landed on the target paper and calculating a score based on how close the shot was with respect to the target area specified on the target paper. FIG. 1A illustrates a target location of impact (LOI) detection system 100 as known in the art, which may be used in a shooting competition by numerous users or participants. The system 100 includes an aiming target 102, which may be a wooden target which the user aims for during shooting, as well as an electronic target 104 located at a predetermined distance "D" behind the aiming target 102 to detect the LOI of the shot that is made with respect to the surface of the aiming target 102. Method of detection includes acoustic detection, such as using acoustic sensors arranged behind the aiming target 102 to detect shockwave caused by the bullet landing on the aiming target 102 via triangulation method.

When the user shoots at the aiming target 102, the origin points of an optical sight axis 106 of the user and a projectile trajectory 108 are offset by a sight adjustment "S" as illustrated, such that the two lines do not align with each other. As such, because the aiming target 102 is positioned forward of the measurement frame of the electronic target 104, the relative offset (i.e., the distance "D") between the aiming target center (shown by the dotted line) and the measurement frame is accounted for by offsetting the relationship between the optical sight axis 106 and the projectile trajectory 108 in a process commonly referred to as "zeroing." As the point of aim (that is, the center of the aiming target 102) remains constant for all participants of the competition, the relative offset is also constant across all shots.

However, when there are multiple points of aim in a target, as shown in FIG. 1B (for example, the first point of aim is marked by the upper dotted line and the second point of aim is marked by the lower dotted line), the user (or participant of the competition) must move the point of aim between each of the separate target details. As there are two sets of optical sight axes 106A, 106B and projectile trajectories 108A, 108B, the relative offset between the aiming target 102 and the measurement frame of the electronic target 104 located behind it, combined with the optical sight offset "S", would no longer be constant among the multiple points of aim, as shown by the two different offsets A and B as shown. Note that "offset A" is such that the location detected by the electronic target 104 is located above the actual point of aim in the aiming target 102, whereas the "offset B" is such that the location detected by the electronic target 104 is located below the actual point of aim in the aiming target 102. As such, re-zeroing would be required between separate shots that are taken so that the offset A and offset B are separately determined and considered when calculating the LOIs and the shooting score for each participant.

The constant re-zeroing and recalculation in view of the multiple different offsets that must be taken into consideration would make the system prone to errors due to miscalculations, as well as imprecision of the calculated score caused by false determination of offsetting during the re-zeroing process. As such, there is a need for a more precise and reliable system for calculating LOIs and shooting scores for aiming targets with multiple points of aim.

SUMMARY OF THE DISCLOSURE

According to the present disclosure, an electronic target measurement system includes at least one image capture device, an access point device, and a user device. Each image capture device is configured to acquire a series of successive real-time images of target(s) with a plurality of regions of interest (ROIs). The series of successive real-time images includes a primary image and a secondary image taken at a predetermined amount of time after the primary image. The access point device is electrically coupled (e.g., via wired or wireless coupling or connection, as suitable) with each image capture device and is configured, in each measurement cycle, to: receive the primary and secondary images; and transmit the primary and secondary images to a user device. The user device is electrically coupled with the access point device and configured to: perform image pre-processing on the primary and secondary images; determine, via an image differentiation process, that the secondary image is different from the primary image; extract the plurality of ROIs and one or more locations of impact (LOIs) from the secondary image; determine, for each of the plurality of extracted ROIs, a ROI center point, any one of the one or more LOIs within the ROI, and a LOI center point for the corresponding LOI; determine, for the each of the plurality of extracted ROIs, a regional score based on a distance between the ROI center point the LOI center point; and determine a total score by adding the regional scores for the plurality of extracted ROIs.

In some examples, the user device is further configured to use the secondary image from a current measurement cycle as a primary image in an image differentiation process of a successive measurement cycle.

In some examples, the user device extracts the plurality of ROIs from the secondary image by: applying an image correction to the secondary image. The image correction includes (1) determining at least one edge of the target(s), (2) calculating a plurality of corner locations of the target(s), (3) transforming the secondary image based on the calculated corner locations, and (4) cropping the transformed secondary image to isolate the target(s) from a background; and determining the plurality of ROIs in the cropped secondary image by applying a circle Hough transformation to the cropped secondary image.

In some examples, parameters of the image correction are automatically determined based on environmental conditions of the target(s).

In some examples, the user device extracts the one or more LOIs from the secondary image by: cropping the determined plurality of ROIs to isolate the determined plurality of ROIs into a plurality of cropped ROI images; and determining the one or more LOIs in the cropped ROI images by applying an image threshold adjustment and the circle Hough transformation to the plurality of cropped ROI images.

In some examples, the user device is configured to determine the ROI center point and the LOI center point for the each of the plurality of extracted ROIs by: determining a plurality of ROI edges by applying the circle Hough transformation to the cropped ROI images; determining a corresponding ROI center point based on each of the plurality of ROI edges; determining one or more LOI edges by applying the circle Hough transformation to the one or more determined LOIs in the cropped ROI images; and determining a corresponding LOI center point based on each of the one or more LOI edges.

In some examples, the user device is further configured to determine, for each of the one or more determined LOIs, a confidence index of the LOI center point by performing a blob conformity analysis on a shape of the corresponding LOI.

In some examples, the user device comprises a user interface and is further configured to: display, on the user interface, the plurality of ROI edges, the plurality of ROI center points, and the one or more LOI edges; and update the user interface to reflect the regional scores associated with the plurality of ROIs.

In some examples, the user device is further configured to: determine, based on a number of ROI center points and a number of LOI center points, that at least one of the ROIs of the target lacks a corresponding LOI associated with the ROI(s); and assign the regional score of zero (0) for the ROI(s) without the corresponding LOI.

In some examples, the user device is further configured to estimate, based on the secondary image, a pixel conversion rate to convert pixel values in the primary and secondary images into a physical distance measurement, and the distance between the ROI center point and the LOI center point is converted from pixel values to a corresponding physical distance measurement based the estimated pixel conversion rate.

In some examples, the series of successive real-time images of the target(s) includes a series of photographs taken in intervals defined by the predetermined amount of time.

In some examples, the series of successive real-time images of the target(s) includes a series of video frame images from a video data recorded by the image capture device(s). The series of video frame images are extracted from the video data in intervals defined by the predetermined amount of time.

In some examples, the image capture device(s) may be implemented in the user device.

In some examples, the electronic target measurement system further includes a remote server electrically coupled with the access point device and the user device. The remote server may be configured to: receive, from a plurality of access point devices or a plurality of user devices, a plurality of total scores associated with a plurality of targets. Each target is remotely located with respect to each other; and transmit, to the user device, a total score associated with one of the other plurality of user devices.

According to the present disclosure, a method is disclosed to include: receiving, by a user device from an access point device, a real-time image from a series of successive real-time images of at least one target with a plurality of regions of interest (ROIs) acquired by at least one image capture device. The series of successive real-time images are taken by the image capture device(s) in intervals of a predetermined amount of time. The method further includes: determining, by the user device, that the received image is different from another image from the series of successive real-time images which immediately precedes the received image; extracting, by the user device, the plurality of ROIs and one or more locations of impact (LOIs) from the received image; determining, by the user device for each of the plurality of extracted ROIs, a ROI center point, any one of the one or more LOIs within the ROI, and a LOI center point for the corresponding LOI; determining, by the user device for each of the plurality of extracted ROIs, a regional score based on a distance between the ROI center point the LOI center point; and determining, by the user device, a total score by adding the regional scores for the plurality of extracted ROIs.

In some examples, the plurality of ROIs are extracted from the received secondary image by: applying, by the user device, an image correction to the received secondary image. The image correction includes (1) determining at least one edge of the target(s), (2) calculating a plurality of corner locations of the target(s), (3) transforming the received secondary image based on the calculated corner locations, and (4) cropping the transformed secondary image to isolate the target(s) from a background; and determining, by the user device, the plurality of ROIs in the cropped secondary image by applying a circle Hough transformation to the cropped secondary image.

In some examples, the method further includes: determining, by the user device, parameters of the image correction based on environmental conditions of the target(s).

In some examples, the one or more LOIs are extracted from the received secondary image by: cropping, by the user device, the determined plurality of ROIs to isolate the determined plurality of ROIs into a plurality of cropped ROI images; and determining, by the user device, the one or more LOIs in the cropped ROI images by applying an image threshold adjustment and the circle Hough transformation to the plurality of cropped ROI images.

In some examples, the ROI center point and the LOI center point are determined by: determining a plurality of ROI edges by applying the circle Hough transformation to the cropped ROI images; determining a corresponding ROI center point based on each of the plurality of ROI edges; determining one or more LOI edges by applying the circle Hough transformation to the one or more determined LOIs in the cropped ROI images; and determining a corresponding LOI center point based on each of the one or more LOI edges.

In some examples, the method further includes: displaying, on a user interface of the user device, the plurality of ROI edges, the plurality of ROI center points, and the one or more LOI edges; and updating, by the user device, the user interface to reflect the regional scores associated with the plurality of ROIs.

In some examples, the method further includes: determining, by the user device based on a number of ROI center points and a number of LOI center points, that at least one of the ROIs of the target lacks a corresponding LOI associated with the ROI(s); and assigning, by the user device, the regional score of zero (0) for the ROI(s) without the corresponding LOI.

According to the present disclosure, a mobile device is also disclosed. The mobile device includes a processor and a memory storing instructions thereon which, when executed on the processor, causes the processor to: receive from an access point device a real-time image from a series of successive real-time images of at least one target with a plurality of regions of interest (ROIs) acquired by at least one image capture device; determine that a first image in the successive real-time images is different from a second image in the successive real-time images which immediately precedes the first image; extract the plurality of ROIs and one or more locations of impact (LOIs) from the second image; determine for each of the plurality of extracted ROIs, a ROI center point, any one of the one or more LOIs within the ROI, and a LOI center point for the corresponding LOI; determine for each of the plurality of extracted ROIs, a regional score based on a distance between the ROI center point the LOI center point; and determine a total score by adding the regional scores for the plurality of extracted ROIs.

While multiple embodiments are disclosed, still other embodiments of the present disclosure will become apparent to those skilled in the art from the following detailed description, which shows and describes illustrative embodiments of the present disclosure. Accordingly, the drawings and detailed description are to be regarded as illustrative in nature and not restrictive.

BRIEF DESCRIPTION OF THE DRAWINGS

The detailed description of drawings particularly refers to the accompanying figures in which:

FIGS. 2A and 2B are each a schematic diagram of an exemplary electronic target measurement system, according to embodiments disclosed herein.

FIG. 3 is a flowchart of target measurement performed by the electronic target measurement system, according to embodiments disclosed herein.

FIG. 4 is an illustrative flow diagram of image differentiation between two successive real-time images as performed by the user device, according to embodiments disclosed herein.

FIG. 5 is a flowchart of shooting score determination as performed by the user device, according to embodiments disclosed herein.

FIG. 6 is an illustrative flow diagram of image processing as performed by the user device, according to embodiments disclosed herein.

FIG. 7A is an illustrative flow diagram of shooting score determination as performed by the user device, according to embodiments disclosed herein.

FIG. 10A is a flowchart of a target alignment process performed by the user device in setup mode, according to embodiments disclosed herein.

FIG. 10B is a flowchart of a shooting score determination process performed by the user device in scoring mode, according to embodiments disclosed herein.

FIGS. 11A and 11B illustrate examples of user device interface in setup mode during target alignment process, according to embodiments disclosed herein.

FIG. 12 is a flowchart of scoring confidence index calculation process as performed by the user device, according to embodiments disclosed herein.

DETAILED DESCRIPTION

Figure 1A:
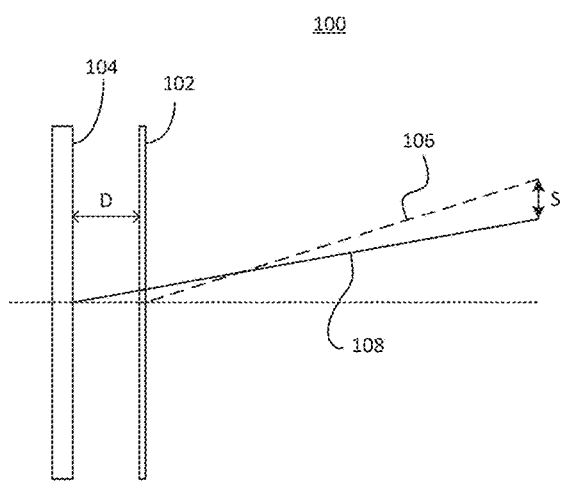
FIGS. 1A and 1B illustrate examples of a target location of impact (LOI) detection system as known in the art.
Figure 1B:
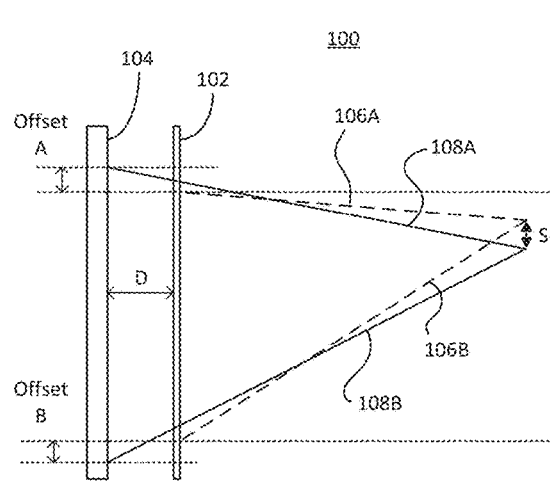

FIG. 2A shows an electronic target measurement system 200 according to examples disclosed herein. The system 200 includes at least one image capture device 202, including but not limited to digital cameras, webcams, or smartphones. Each of the devices 202 is capable of acquiring a series of successive real-time images or photographs of at least one target 208 located at a distance from the device 202. The target 208 each has multiple regions of interest (ROIs) 210, or points of aim for the user or participant using the system 200. The system 200 also includes an access point device 204 electrically coupled with the image capture devices 202 to receive the images of the targets 208 for processing and analysis. The system 200 also includes at least one user device 206 electrically coupled with the access point device 204. The access point device 204 may also be referred to as a "central hub" since the image capture devices 202 and the user devices 206 are in constant communication with the access point device 204, which may act as a "command central" for the system 200. In some examples, the camera devices or the image capture devices 202 may each be equipped with a directional aerial antenna 230 to allow the devices 202 to transmit data to the central hub or access point device 204. The user device 206 may be a mobile device such as mobile terminal, smartphone, smart tablet, personal computer, or any suitable computing device capable of performing processes as disclosed herein. In some examples, the image capture device 202 may be implemented in the user device 206, for example when the user device 206 is a smartphone and the image capture device 202 is a smartphone camera. Even though only two image capture devices 202 are shown in FIG. 2A, it is to be understood that any suitable number of image capture devices 202 may be implemented to be communicable with the access point device 204.

The system 200 includes a digital communication network 212 which facilitates data communication between the access point device 204, the user devices 206, and a remote data server 214. The remote data server 214 may receive, from the access point devices 204 or the user devices 206, total scores associated with the targets 208, where each target is remotely located with respect to each other, and also transmit a total score associated with a user device 206 either to the same user device 206 or to another user device 206 of a different user (that is, sharing scores with other users or participants to facilitate competition, for example).

FIG. 2B is an example of the electronic target measurement system 200 according to examples disclosed herein, where multiple access point devices 204 may form a daisy chain data connection using physical wire connection(s) and/or a wireless connection such as Wi-Fi or Bluetooth.

The daisy chain provides a flow of information between each access point device. For example, the access point device (e.g., 204A) may communicate information/data between another access point device (e.g., 204B), the another access point device may communicate information/data between yet another access point device, and so on, such that the access point device 204A may communicate information with the last access point device 204N of the daisy chain having N access point devices, for example. In such settings, each of the access point devices 204 may be set up either as a master or as a slave. Each access point device 204 communicates with its own image capture device(s) 202 and user device(s) 206, but for simplicity, the image capture devices and user device(s) which may be associated with the multiple access point devices are not shown in FIG. 2B. The data received from the last image capture device would include the data associated with all the other image capture devices connected via the daisy chain connection. In some examples, the antennas 220 may be absent from the access point devices 204 if no wireless communication is implemented. Both of the aforementioned configurations in FIGS. 2A and 2B may allow the users to participate in a multi-lane competition.

For example, the network 212 may be a cloud network, Internet, local area network (LAN), wide area network (WAN), private networks, and/or the like. The broken lines in FIGS. 2A and 2B may each represent data communication, which may be performed via wired or wireless communication, including but not limited to Wi-Fi, Bluetooth, Global System for Mobile Communications (GSM), Long-Term Evolution (LTE), 3G/4G/5G network, and/or the like, as suitable. The wireless communication may be facilitated using antennas 220, 228, 230 for wireless transmission interface, as integrated with the access point device 204, the user device 206, and the image capture device 202, respectively. In some examples, any one or more of the antennas 220, 228, 230 may be an external antenna or an embedded antenna. The access point device 204 includes a processor 216 and memory 218, and the user device 206 includes a processor 222, memory 224, and user interface/display 226. In some examples, one or more of the image capture devices 202 may also include a processor 232 in order to facilitate such wireless data transmission or communication. In some examples, the processor 232 may facilitate an autofocus functionality for the image capture device 202 to achieve a sharper image. In some examples, any one or more of the image capture device(s) 202, the access point device 204, and/or the user device(s) 206 may have a battery 234 (internal and/or external) installed thereto. Additionally or alternatively, the battery 234 may be replaced with an external power source as suitable.

FIG. 3 is a process 300 which is performed by the user device 206 of the system 200 according to examples disclosed herein. The process 300 involves acquiring series of successive real-time images of a multi-ROI target by the image capture devices 202, in step 302. In step 304, the device receives from the access point device the first image taken by the image capture device. In step 306, the device performs image preprocessing on the received first image. In step 308, a newer second image taken by the image capture device is received from the access point device, subsequent to the first image. In step 310, image preprocessing is performed on the second image as well. In an image differentiation step 312, the device determines whether there is a difference between the first and second images, for example by performing a subtraction process based on the two images. If no difference is detected, the process proceeds to step 316, where the second image as received in the previously performed step 308 is used as the "first image" in the subsequent analysis (image differentiation step 312). In the subsequent step 308, another newer second image taken by the image capture device is received from the access point device, to be used as the "second image" in the subsequent image differentiation step 312.

If the image differentiation step 312 determines that there is a difference between the two analyzed images, the process proceeds to step 314 in which the shooting score of the user is calculated based on the received second image. Thereafter, the process proceeds to step 316, after which the image differentiation step 312 is repeated each time a new second image is obtained in order to detect any new shot being made.

A process 400 is shown in FIG. 4 to illustrate how the image differentiation can be achieved from two consecutively received images. A first image 402 is a real-time image of the target 208 with multiple ROIs 210, obtained at time t1 by the image capture device 202. A second image 404 is another real-time image of the target 208, obtained at time t2 by the image capture device 202, where t2=t1+ $t_{interval}$ in which $t_{interval}$ is a predetermined interval time between two consecutive images being taken. For example, the image capture device 202 may be configured such that a new image is taken or generated once every 0.1 second, 0.5 second, 1 second, 2 seconds, 5 seconds, 10 seconds, or any other suitable range or value therebetween. In some examples, the series of successive real-time images of the target includes a series of video frame images from a video data recorded by the image capture device 202, such that the series of video frame images are extracted from the video data in the predetermined interval time $I_{interval}$.

An image differentiation process 406 is performed on the two images 402 and 404, which may include image preprocessing such as image threshold determination and edge/corner detection as well as performing warp transformation based on the detected edges/corners, as further explained herein. As a result of the image differentiation 406, an image 408 showing the difference between the images 402 and 404 is obtained, which may be obtained via subtraction process, e.g., by subtracting the features of the first image 402 from the second image 404. In the image 408, the difference 410 is shown, which in this example illustrates a black dot indicative of a new shot, or a new location of impact (LOI), formed on the target 208.

FIG. 5 is a process 500 performed by a user device (e.g., the user device 206) according to examples disclosed herein. In step 502, an image data is received from an access point device (e.g., from the access point device 204). A collection of steps (shown as 503) is performed by the user device; these steps are hereinafter collectively referred to as image processing 503. The image processing 503 includes step 504, where ROIs and LOIs are extracted from the received image. Then, in step 506, each ROI center point is determined, as well as any LOI within each ROI as determined, and the LOI center point of the corresponding LOI as extracted. Subsequently or concurrently, in step 508, the confidence index of the extracted LOI is determined. In step 510, the regional score for the user is determined for each extracted ROI. In step 512, the total score is determined based on the regional scores, e.g. by summing the individual regional scores of the ROIs as suitable. In some examples, the image processing 503 may include additional steps such as the image preprocessing steps 306 and 310 of the process 300 as explained in FIG. 3.

A process 600 is shown in FIG. 6 to illustrate how the image processing (e.g., the image processing 503 referred to in FIG. 5) can be performed based on the received image, according to examples disclosed herein. The received image is represented as the second image 404 from FIG. 4, which includes the target 208 and the multiple ROIs 210 as well as the newest shot that is formed on the target 208, i.e. the difference 410. Image processing 602 is performed to obtain a processed image 604 based on the original raw data of second image 404. For example, the image processing 602 may include image correction processes including, but not limited to: edge detection for detecting at least one edge or edges 606 of the target 208, corner detection for detecting at least one corner location or corner locations 608 of the target 208, warping or transforming the second image 404 based on the detected edge(s) and corner location(s) such that the target 208 is represented substantially as a square or rectangle, as suitable, based on the known dimensions of the target 208 that is used, for example. In some examples, the parameters of the image correction are automatically determined based on environmental conditions of the target, including but not limited to the brightness/darkness of the surroundings, for example. The warped or transformed image is then cropped to isolate the target 208 from background 610 such as the scenery or walls. The processed image 604, therefore, is the resulting image showing only the target 208 in its upright position, after warping/transforming and cropping the original second image 404 as obtained.

Subsequently, in FIG. 7A, a process 700 is performed on the processed image 604 to further determine the multiple features as further explained herein. As known in the art, circle Hough transform (CHT) is a feature extraction technique used in digital image processing for detecting one or more circles in digital images. The circle Hough transform technique 702 is performed on the image 604 such that the resulting image 604 has a plurality of circles 704 identified therein, such that each circle 704 represents a single ROI 210, or more specifically, an outermost edge or circumference of a single ROI 210 of the target 208. Subsequently, a cropping and isolating technique 706 is performed, to isolate each detected ROI in an individual image, thereby obtaining a plurality of ROI images 708. Each ROI image 708 is cropped based on the detected ROI edge 704 in order to isolate the ROI image such that each ROI image 708 includes only one ROI 210 without any other ROI 210 of the same target 208.

Figure 7B:
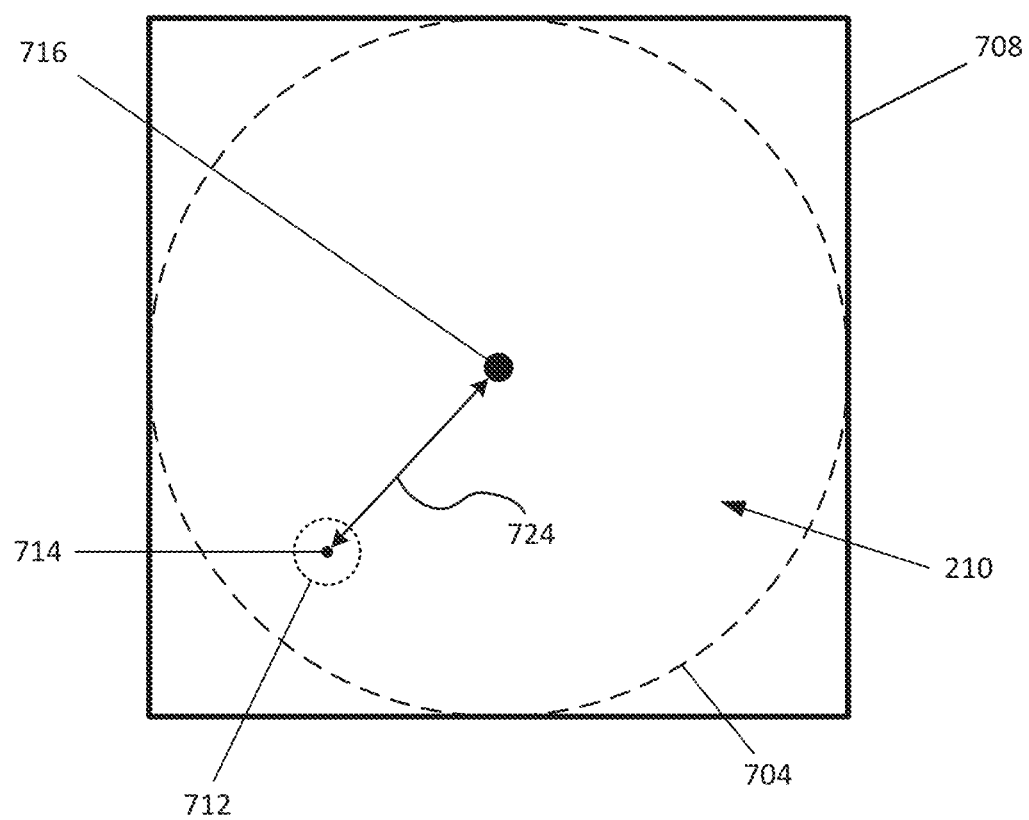
FIG. 7B is an enlarged view of a cropped region of interest (ROI) image obtained in the flow diagram of FIG. 7A.

In step 710, another circle Hough transform technique and a center point determination technique is performed on each ROI image 708. The circle Hough transform technique in this step is applied to determine a circle which corresponds to the detected difference 410 in the ROI image 708, representing an outermost edge of the LOI, or the shot made by the user in the ROI 210. As shown in FIG. 7A, and with more detail in FIG. 7B, the two circles (704 and 712) generated by the two circle Hough transform techniques (702 and 710, respectively) have different sizes or diameters, with the larger circle 704 representing the ROI edge and the smaller circle 712 representing the LOI edge. Based on these two circles, the ROI center point 716 and the LOI center point 714 are determined, after which a distance 724 between these center points are also calculated. The distance 724 represents how far the LOI (where the shot landed on the target) strays from the center point of the ROI (where the user was aiming for), which is used in step 720 to calculate the regional score for the user with respect to the specific ROI that was analyzed. The same analysis is performed on all the other ROI images 708 (where a regional score of "0" is given to a ROI if no LOI edge 712 could be determined within the ROI). After all the regional scores are calculated, in step 722, a total score is calculated for the user.

In some examples, a confidence index calculation 718 may be performed by the user device to determine how "confident" the device is in terms of detecting an actual shot being located in a ROI. For example, if the circle Hough transform technique of step 710 returned with a circle that does not accurately or satisfactorily match the actually detected shape of the difference 410, the device may assign a low confidence index, indicating that the regional score that is generated based on the detected LOI may be subject to further scrutiny or analysis, perhaps by the user or the reviewer of the scores. Such cases may arise if the difference 410 detected in the ROI image 708 does not resemble a circular shape, which may be determined using any suitable method as further explained herein, such as a blob conformity analysis based on the shape of the corresponding LOI.

Figure 8:
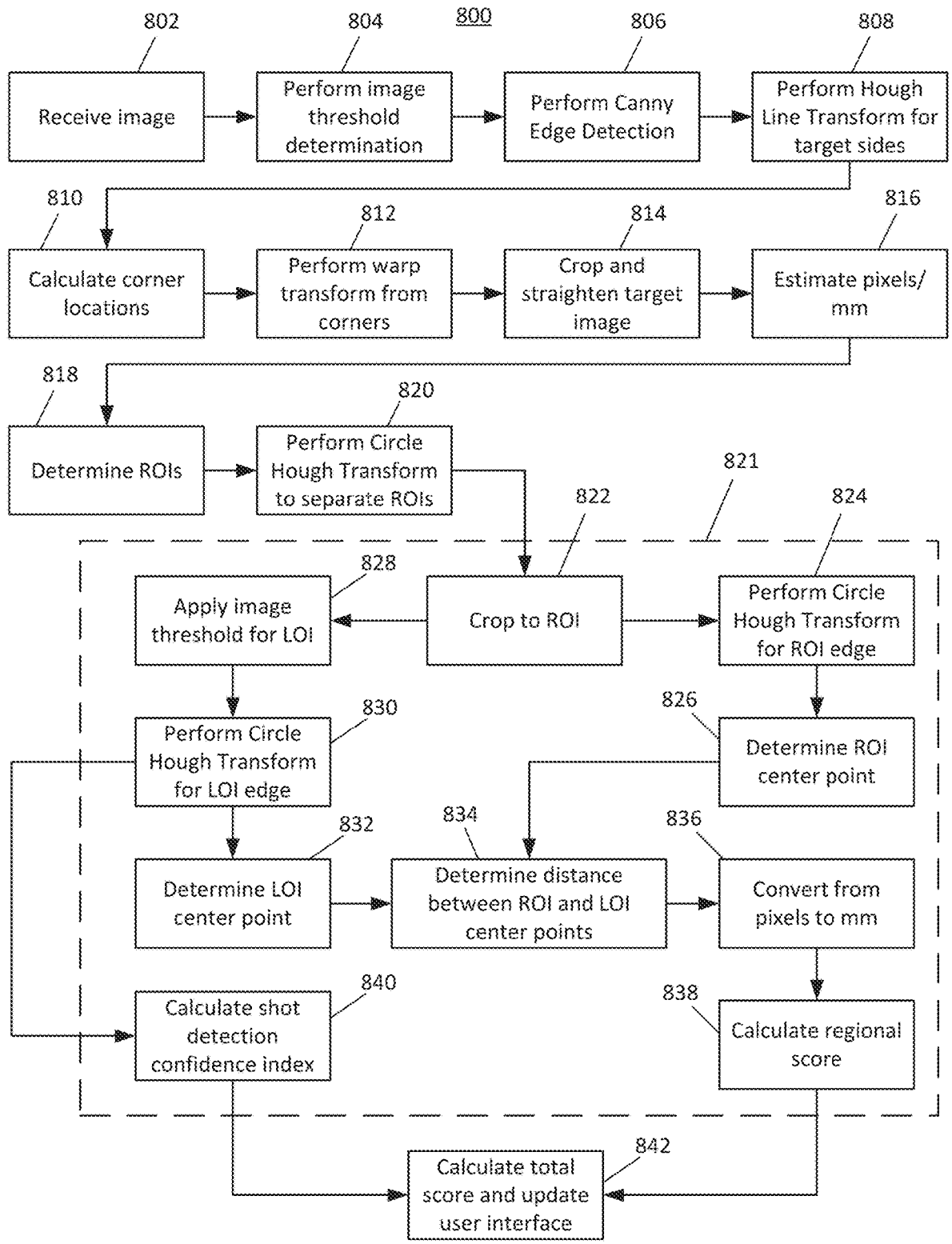
FIG. 8 is a flowchart of shooting score determination as performed by the user device, according to embodiments disclosed herein.

FIG. 8 illustrate a process 800 performed by a user device (e.g., the user device 206), according to examples disclosed herein. In step 802, image data is received from an access point device. The image may be the second image 404 of FIG. 4, for example, and it may be transmitted from the access point device. In step 804, image threshold determination or adjustment is performed, also referred to as "thresholding", which is a form of image segmentation such that pixels of the image are modified in order for the image to be easier to analyze. Examples of thresholding may include, but are not limited to, image conversion from color to grayscale and/or image alteration with respect to the brightness or contrast of the image, etc.

In step 806, edge detection is performed on the image. Examples of edge detection may include, but are not limited to, discontinuity determination within the image using difference measured in brightness and/or contrast in the image, such as via Canny edge detection or any other suitable form of edge detection as known in the art. In step 808, the sides (i.e., the straight lines defining the outer edges) of the target are detected, for example via a Hough line transform technique or any other suitable technique as known in the art. In step 810, corner locations are calculated, for example by determining the intersecting locations of the sides (straight lines) as detected in step 808.

In step 812, image readjustment, such as warping or transformation, is performed based on the detected corner locations. For example, based on the knowledge that the target to be recognized is square or rectangular in shape, the corner locations can be adjusted (warped and/or transformed) to fit the square or rectangular shape. In some examples, the actual dimensions or ratio of the sides of the target can be utilized. That is, if the target is known to have a specific length and width or a specific length-to-width ratio, such information can be used in the image adjustment.

In step 814, the image of the target is cropped and straightened based on the image adjustment, such that only the target is shown as viewed from straight ahead. The cropping isolates the target from the background, and the straightening reduces the effects of any distortion caused by the angle at which the image capture device may be positioned (e.g., when the image capture device is positioned crookedly or looking up or down toward the target, not straight ahead at eye level). In step 816, the pixels-to-distance conversion is performed based on the image data. For example, when the exact dimensions of the target is known, the image can be analyzed such that each pixel can be calculated as spanning a certain distance on the surface of the physical target. The conversion rate may differ based on the distance between the target and the image capture device, as well as the image resolution in which the digital images of the target are captured.

In step 818, the number and locations ROIs on the target are determined. For example, the image may be processed to determine how many ROIs exist on the single target via machine image recognition, the user may input how many ROIs are present on each target, or the number of ROIs is predetermined and thus stays consistent for all targets used throughout an event, such as a shooting competition. In step 820, circle Hough transform technique is performed to separate the image into individual ROIs for further processing. A collection or series of steps (821) is performed for each of the separated ROI.

In step 822, the image is cropped such that each ROI is in an individual and separate image that does not include any other ROI. In step 824, circle Hough transform technique is performed for detecting the ROI edge, that is, the edge of the individual ROI of the target. In step 826, the center point of the ROI is determined based on the detected ROI edge. In step 828, image threshold determination (or "thresholding") is performed or applied on the individual cropped ROI image from step 822. In step 830, circle Hough transform technique is performed to detect the LOI edge based on the ROI image, where the LOI is understood as the location where a shot landed on the target. If there is no LOI that is detected, the user device may indicate as such, in which situation the regional score of "0" is associated for this particular ROI image. However, even if a LOI edge is detected, the user device may not be confident that the detected LOI actually pertains to a shot on the target (for example, the detected LOI edge may be an insect or a piece of debris which happened to land on the target). To reduce the risk of calculating a score based on falsely identified LOI, in step 840, a shot detection confidence index may be calculated, as further explained herein, where the higher the confidence that the LOI is an actual shot, the higher the confidence index becomes.

In step 832, the LOI center point is determined based on the detected LOI edge from step 830. In step 834, the distance between the ROI center point as determined in step 826 and the LOI center point as determined in step 832 is determined or calculated as a number of pixels. In step 836, the number of pixels is converted into a physical distance (for example, millimeters) based on the conversion rate estimated in step 816. Thereafter the regional score for the ROI image is calculated in step 838, based on the calculated physical distance between the ROI and LOI center points. Steps 822 through 840 may be repeated for each ROI that is determined in step 818, such that each ROI has its own LOI (if applicable) and thus a regional score associated with the LOI (which may be "0" if no LOI is detected). In step 842, once all the regional scores are calculated, the total score is calculated and the user interface is updated accordingly to reflect the total score for the user, as well as any other suitable information or graphics for the user's review. Such information may include, but are not limited to, the shot detection confidence index for each detected LOI, the image data of the ROIs with comments or indications (such as shooting score statistics) of how well the user has performed, tips on how to improve future scores based on the calculated data associated with the user, etc. In some examples, the information associated with other users, for example other participants with whom the user is competing, may be provided or displayed via the user interface such that the user is able to compare his or her score with that of the other users or participants. In some examples, any one or more of the ROI edges, ROI center points, LOI edges, or LOI center points may be displayed on the user interface, and the user interface may be updated to reflect the regional scores associated with the plurality of ROIs.

Figure 9:
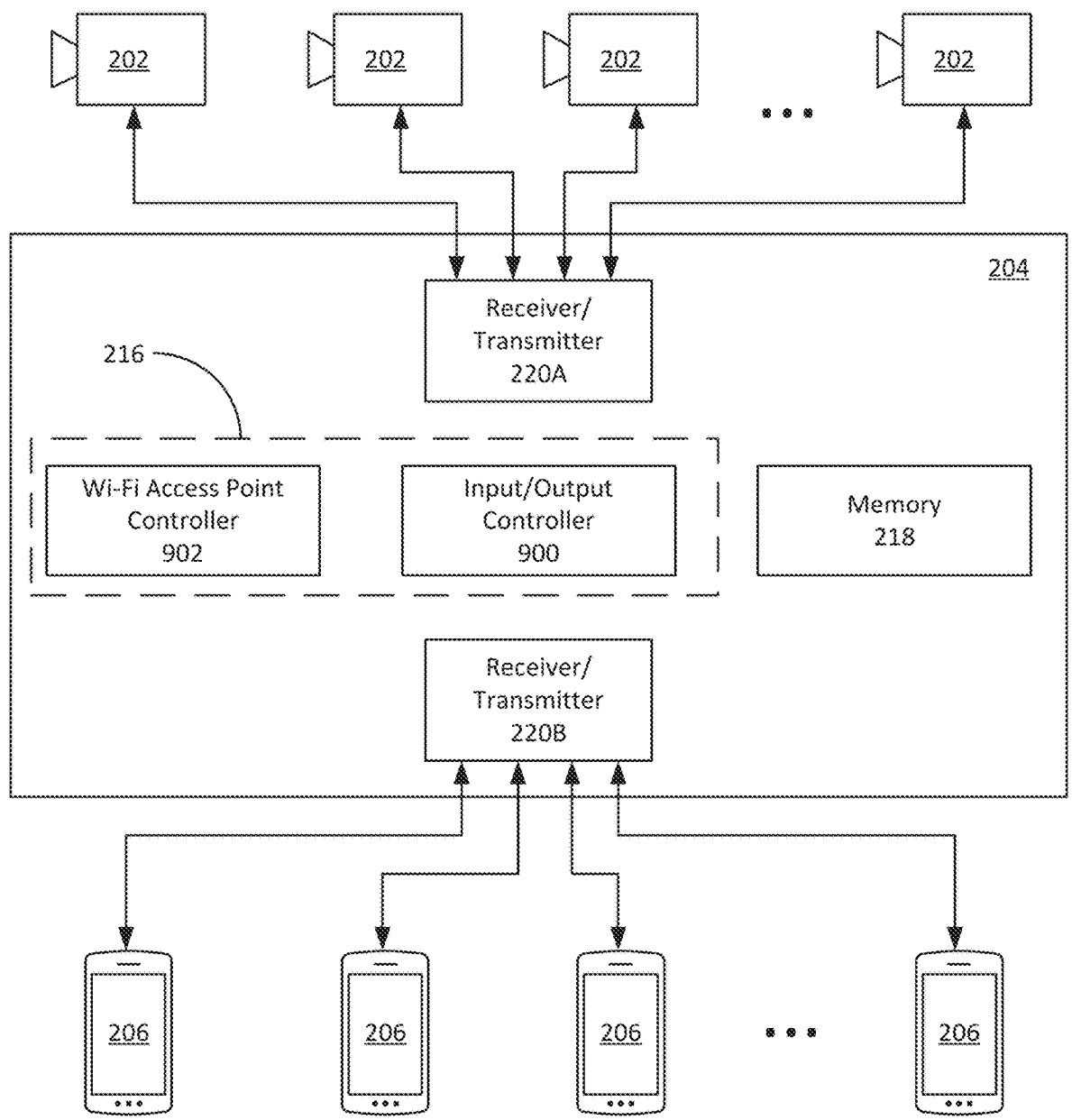
FIG. 9 is a schematic diagram of an exemplary electronic target measurement system, according to embodiments disclosed herein.

FIG. 9 shows another example of the electronic target measurement system 200 according to examples disclosed herein. The antenna 220 of the access point device 204 may be used as a receiver/transmitter 220A and a receiver/transmitter 220B such that data associated with the plurality of image capture devices 202 may be received/transmitted (e.g., wirelessly) via the receiver/transmitter 220A by the access point device 204, and data associated with the user devices 206 may be received by or transmitted from the access point device 204 via the receiver/transmitter 220B that is associated with (e.g., wirelessly coupled with) each of the user devices 206. The processor 216 includes an input/output controller 900 for controlling the data that is to be received or transmitted by the access point device, including the data of image stream as well as the users' score data, for example, as well as when to receive or transmit certain data to the other devices.

In some examples, the processor 216 may control which devices may be able to access the access point device 204 (for example by setting a password or checking the devices' access credentials), and may allow for additional cameras or image capture devices 202 to access the access point device 204. In some examples, the processor 216 may be capable of monitoring and/or managing the battery or batteries 234 of any one or more of the image capture device(s) 202, the access point device 204, and/or the user device(s) 206, such that the battery status is constantly received by the access point device 204. In some examples, the access point device 204 may transmit notifications to be displayed (e.g., by the user device 206) when the battery status is determined to be too low. The notification may instruct for the device to be attached to an external power source, for example a power grid or an external battery. In some examples, the notification may include additional information such as the preferred type(s) of battery to be provided so as to enable the devices to operate in an environmental condition as detected by the access point device 204. For example, the access point device 204 may determine the temperature and/or humidity of the location and select the preferred type(s) of battery that can offer optimal performance under such condition.

In some examples, the controller 900 may process data that is inputted or received, for example the user scores, such that the user scores may be organized in a predetermined manner (e.g., by ranking, by region, by group, by time, etc.). The processor 216 also includes a Wi-Fi access point controller 902 configured to control the wireless access of the devices associated therewith, for example the multiple image capture devices 202 and the multiple user devices 206, as well as to detect and maintain the wireless signal strength. In some examples, the access point device 204 may operate as a wireless hotspot or communication hub for the aforementioned devices. In some examples, the controller 902 may facilitate Bluetooth wireless communication instead of or in addition to Wi-Fi communication, and/or any other suitable digital wireless communication technology as known in the art, including but not limited to: infrared, near field communication, ultra-wideband, and Zigbee, etc.

In some examples, the memory 218 may store thereon the user score data, or the user score data may be stored on a remote data server such as the server 214 to which the access point device 204 may have access via the Internet. In some examples, using the Internet, the access point device 204 and/or the user device 206 may be capable of accessing a cloud platform (e.g., a cloud data network or cloud data storage) such as the cloud network 212 in order to download additional target type(s) to match the specific type that is used for the target 208. In some examples, the user device 206 may automatically identify the target type using image analysis and automatically download the appropriate data from the cloud network 212.

In some examples, the access point device 204 is capable of simultaneously providing access to multiple devices 202 and 206 such that the users may participate in a real-time or live competition using any suitable type of local wireless data communication, such as using a local Wi-Fi, using a local router (which may be accessed through the access point device 204), or using mobile communication such as via the mobile device 206 (using the access point device 204 as the common communication hub for all users, for example). In some examples, the real-time or live competition may be broadcasted or displayed via an external device such as a display (e.g., a TV screen, computer monitor, or tablet touchscreen) which may or may not be associated with the access point device 204. For example, the access point device 204 may transmit or upload the relevant data such as the image stream data and score data to the cloud network 212, and the external device may access the cloud network or platform 212 to receive or download the relevant data to be broadcasted or displayed. In some examples, the access may be limited or controlled using a software application (such as a mobile app) installed on the external device.

In some examples, the access point device 204 and/or user device 206 may provide additional functionality as described herein. In one example, the access point device 204 and/or user device 206 may provide a chat facility to allow users to communicate with each other and exchange kudos with each other for achievement and recognition via the Internet or via device-to-device (D2D) communication through the access point device 204 and/or user device 206. In another example, the access point device 204 and/or user device 206 may provide a weather link to show the condition of the location where the users are shooting. In another example, the user devices 206 may interact with wearable devices such as a smartwatch or a heart rate monitor or other compatible wearable devices, and the access point device 204 and/or user device 206 may relay that data between user device 206 and/or cloud network or platform 212. In yet another example, the access point device 204 and/or user device 206 may facilitate a live simulation such that the user can practice shooting against a previous user or player such as a prior champion of a shooting competition and compare the scores with those of the previous user or player.

In some examples, the image capture devices 202 are capable of generating images in two different resolution: low resolution image and high resolution image. Low resolution images are beneficial in streaming a live image/video feed from the image capture device 202 as an image stream comprising a plurality of consecutively acquired images, each with a low resolution in order to reduce the data bandwidth of the wireless digital transmission. High resolution images are beneficial in feature detection because they include more information than low resolution images. For example, a low resolution image may have 320 pixels by 240 pixels or lower (with a continuous stream of image files at a frequency of 1 to 2 frames per second, for example), while a high resolution image may have 1280 pixels by 720 pixels or higher. These numbers are provided for illustrative purposes only, and it is to be understood that any suitable numbers of pixels and frame-per-second frequency may be implemented as suitable.

The images are transmitted from the image capture device 202 to the access point device 204, and then from the access point device 204 to the user device 206 in order for the user device 206 to perform image processing and shot detection. More specifically, the low-resolution images are transmitted from the access point device 204 to the user device 206 during "Setup Mode" and the high-resolution images are transmitted to the user device 206 during "Scoring Mode." Each of these modes are explained herein with respect to FIGS. 10A and 10B.

FIG. 10A shows a process 1000 performed by a user device during the "Setup Mode." When the user device is in "Setup Mode," the user device is assigned to one of the image capture devices and one of the shooting lanes, in step 1002. In step 1004, low-resolution images are received as image stream from the assigned image capture device via the access point device. In step 1006, instructions are displayed on the user interface of the user device for the user to align a corresponding target image with a predefined region on the user interface, in order for the image capture device to adequately capture high-resolution images of the target for future processing. In step 1008, the user device determines whether the target is at its correct position with respect tot the predefined region on the user interface. If the target is not correctly positioned, step 1006 is repeated; otherwise, step 1010 is performed, where the user device exits "Setup Mode" and enters the "Scoring Mode" as explained in FIG. 10B. However, if it is further determined that the setup of another camera 202 or target 208 is required, the process 1000 (that is, all the above-mentioned "Setup Mode" steps) is repeated until all the cameras/targets are set up and aligned, after which the "Scoring Mode" can be entered.

FIG. 10B shows a process 1012 performed by the user device during the "Scoring Mode." In step 1014, a detection of new shot is determined or detected. The new shot may be determined or detected by the user device via the image differentiation process as explained herein. In step 1016, a high-resolution image of the target is received from the access point device. In step 1018, image processing is performed on the high-resolution image, as explained herein. In step 1020, confidence index is calculated based on the processed high-resolution image, and user confirmation is requested, if application. For example, if the confidence index is low or below a threshold value, a message or notification may be generated on the user interface to notify the user to input information, for example a visual confirmation by the user that the detected shot is indeed an actual shot and not an error. In step 1022, the regional score is calculated for each ROI, as explained herein, and in step 1024, all the regional scores are summed into a total score.

FIGS. 11A and 11B show the user interface 226 during steps 1106 and 1008 in the "Setup Mode" according to an embodiment. FIG. 11A shows an example of the user interface 226 of the user device 206 showing predefined region (within marks 1100 showing the corners of the region) on the user interface 206. The image of the target 208 is not aligned inside the marks 1100 so a message 1102 is generated to notify the user to align the image of the target 208 correctly. In FIG. 11B, the image of the target 208 is correctly aligned, and the message 1102 indicates as such.

FIG. 12 shows a process 1200 for scoring confidence index calculation as performed by the user device according to examples disclosed herein. In step 1202, the user device determines or obtains the predefined threshold values for the spread and conformity to be used in subsequent steps as explained herein. After determining or obtaining the threshold values, steps 1204 and 1216 are performed, in some examples concurrently or simultaneously with each other. Steps 1204 through 1210 as collectively referred to as a "spread test" while steps 1216 through 1222 are collectively referred to as a "conformity test."

Spread test: In step 1204, circle Hough transform technique is performed multiple times for each detected LOI. In step 1206, a center point is calculated for each Hough circle. In step 1208, a spread of all the Hough circle center points is calculated with respect to the LOI center point. In step 1210, the user device determines if the spread is within a threshold range. If so, in step 1212, the user device waits until the result of the conformity test is obtained; otherwise, in step 1214, the regional score is requested from the user via user input, because the spread is too wide to be reliably used for regional score calculation.

Conformity test: In step 1216, the ideal Hough circle edge and Hough circle center point are determined. In step 1218, the ideal Hough circle edge and Hough circle center point are positioned over the detected LOI. In step 1220, a blob conformity of the detected LOI with respect to the idea Hough circle is calculated, using any suitable method known in the art. In step 1222, the user device determines if the blob conformity is greater than a threshold value. If so, the user device waits until the result of the spread test is obtained in step 1212; otherwise, the regional score is requested from the user via user input in step 1214, because the detected LOI does not conform with the idea Hough circle, thereby having a greater likelihood that the detected LOI is not the shot made on the target.

Upon detecting the completion of both the spread test and the conformity test, the user device determines in step 1212 whether the results from both tests are positive, or "yes"— that is, whether the spread is determined as within the threshold as per step 1210 and the conformity is determined to be greater than the threshold as per step 1222. If so, the process 1200 proceeds to step 1224 where the regional score is automatically calculated based on the detected LOI center point and entered into the system. However, if either result of the spread test or conformity test is negative, or "no", the regional score is requested from the user via user input in step 1214 due to the reasons explained above (that is, either because the spread is too wide to be reliably used for regional score calculation, or because the detected LOI does not conform with the idea Hough circle). The regional score, therefore, is automatically calculated only if the results of both tests are satisfactory, that is, the scoring confidence is sufficiently high.

Figure 13:
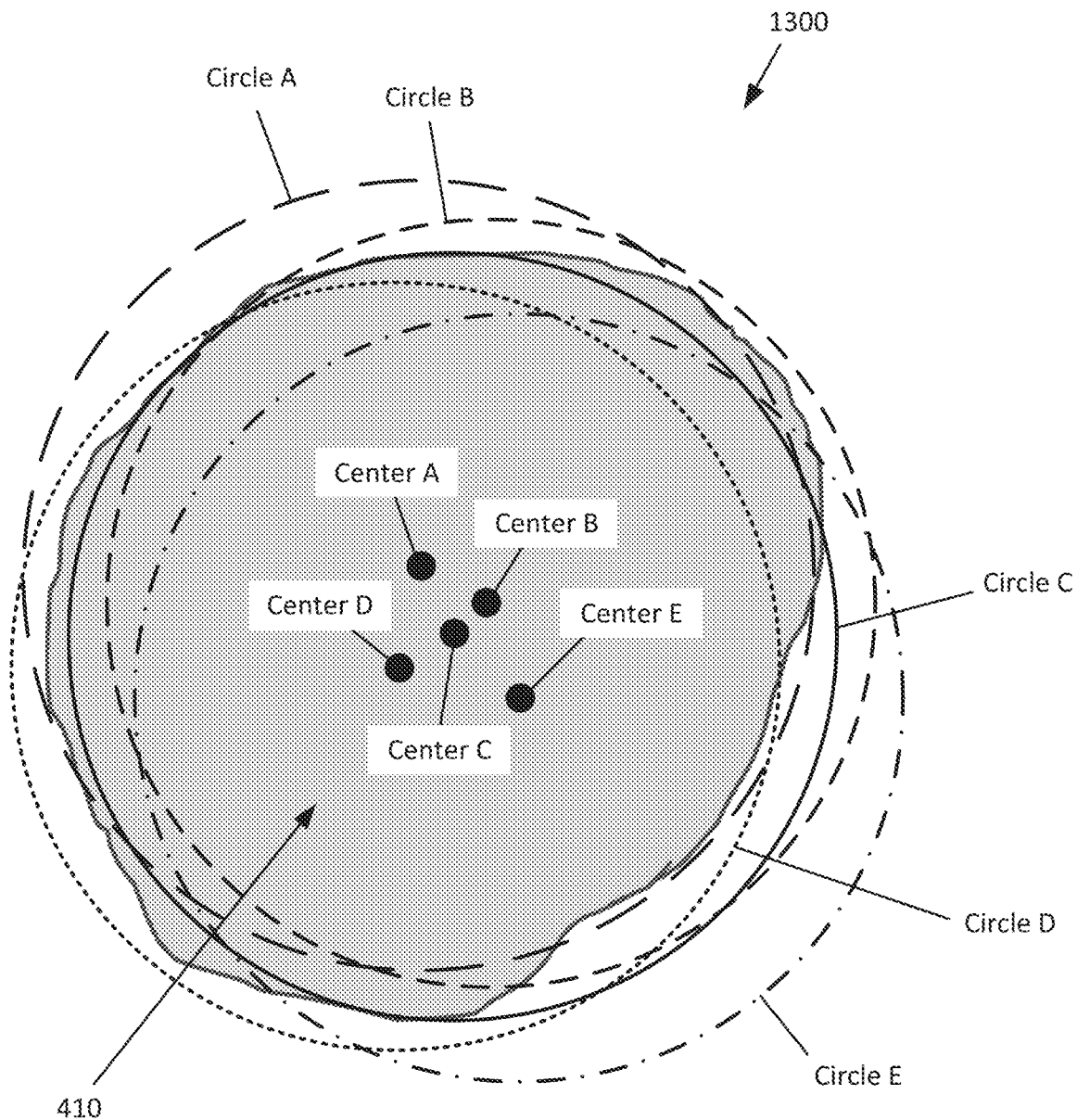
FIG. 13 illustrate examples circles and centers thereof as determined via circle Hough transformation, according to embodiments disclosed herein.
Figure 14A:
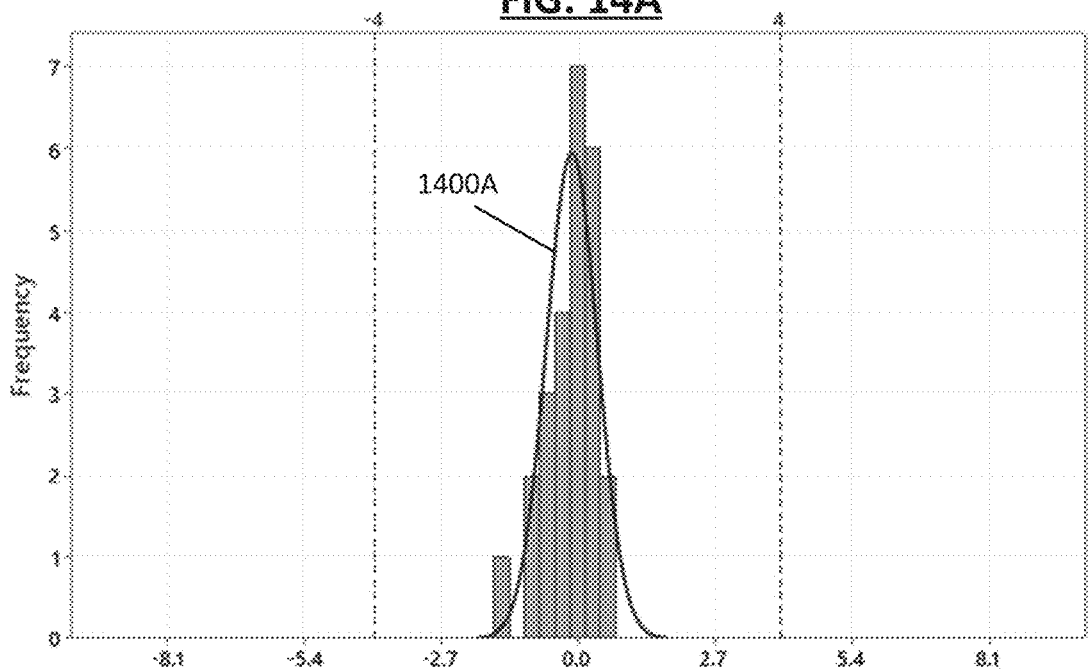
FIGS. 14A and 14B are frequency charts of the determined center coordinate and shot coordinate illustrating the variance in detected LOIs, according to embodiments disclosed herein.

FIG. 13 shows a plurality of generated Hough circles 1300 as illustrated with respect to the detected LOI 410, such that Hough circles A through E (each shown with a different line) are generated via the circle Hough transform technique, with corresponding centers A through E, respectively, shown to illustrate the different possible Hough circle center points which can be calculated in step 1206, to be used for regional score calculations. Although only five Hough circles are shown, there may be any suitable number of circles generated, for example 5, 10, 15, 20, 25, 30, 35, 40, 45, 50, or more circles, as well as any number therebetween. A greater number of circles generated provides more datapoints for step 1208, where a spread of all the Hough circle center points is calculated. For example, if the Hough circle center points are located in close proximity within each other, as shown in FIG. 14A, for example, the spread is low. However, if the Hough circle center points are dispersed with respect to each other, as shown in FIG. 14B, for example, the spread is high.

Figure 14B:
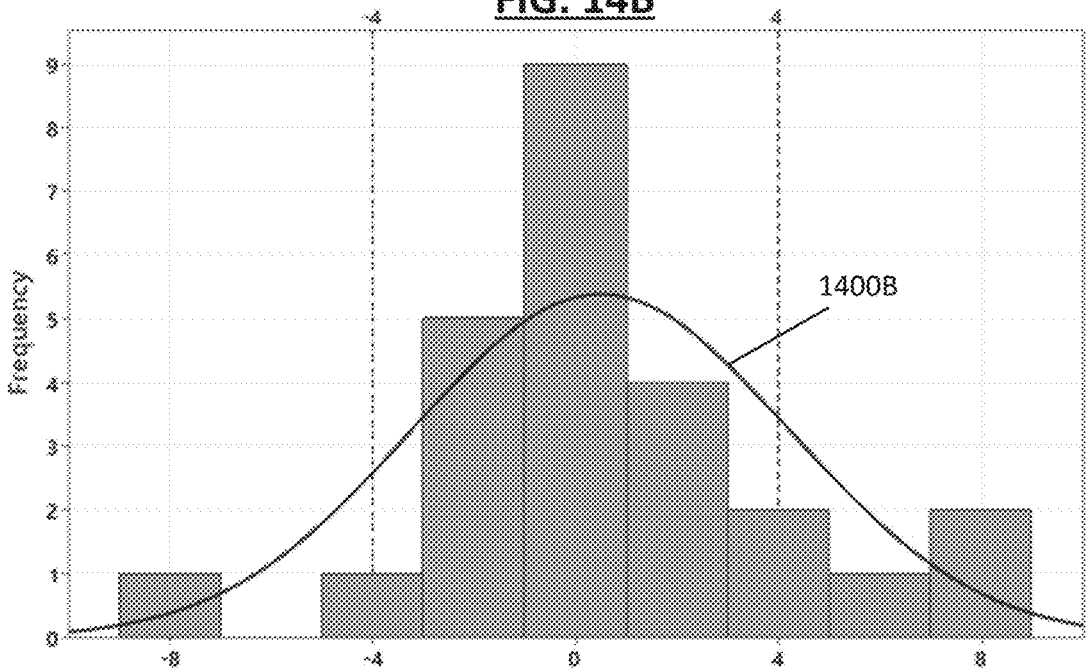

FIGS. 14A and 14B represents two different instances of Hough circle center coordinate variance, where the x-axis in each figure represents the distance (for example, in pixels or physical distance) of each detected Hough circle center point from the coordinate of the determined LOI center point. The width of each bar shows the relative range in which the detected Hough circle center point was located relative to the LOI center point (for example, positive value for being located on the right and negative value for being located on the left of the LOI center point). For example, in FIG. 14A, seven (7) Hough circle center points are located at or within the range of 1 mm from the LOI center point coordinate. Aside from the single instance where a single Hough circle center point is detected at a range between 0.9 mm and 1.1 mm to the left of the LOI center point coordinate, all the instances were located within the range of less than 0.7 mm from the LOI center point coordinate.

As a result, the distribution curve 1400A of the Hough circle center points is narrow and falls within the threshold range of between −4 and 4, or within the 4 mm radius from the LOI center point coordinate, therefore allowing the score to be generated and entered, as per step 1224. In comparison, FIG. 14B shows a wider range of variance, with a total of three (3) instances of the Hough circle center point falling at a range of 7 to 8 mm removed from the LOI center point. As a result, the distribution curve 1400B of the Hough circle center points is broad and exceeds past the threshold range of between −4 and 4, therefore requiring manual input of the score from the user, as per step 1214. Although the threshold range of between −4 and 4 (mm) is used herein, any threshold range may be implemented, as suitable.

Figure 15A:
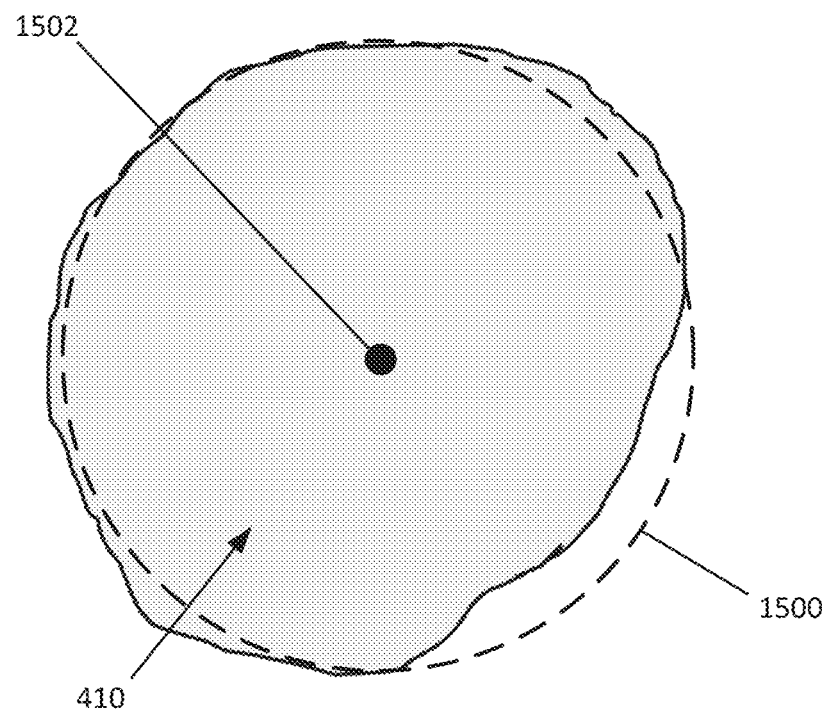
FIGS. 15A and 15B illustrate examples of blob conformity of a detected LOI based on the circle generated via circle Hough transformation, according to embodiments disclosed herein.
Figure 15B:
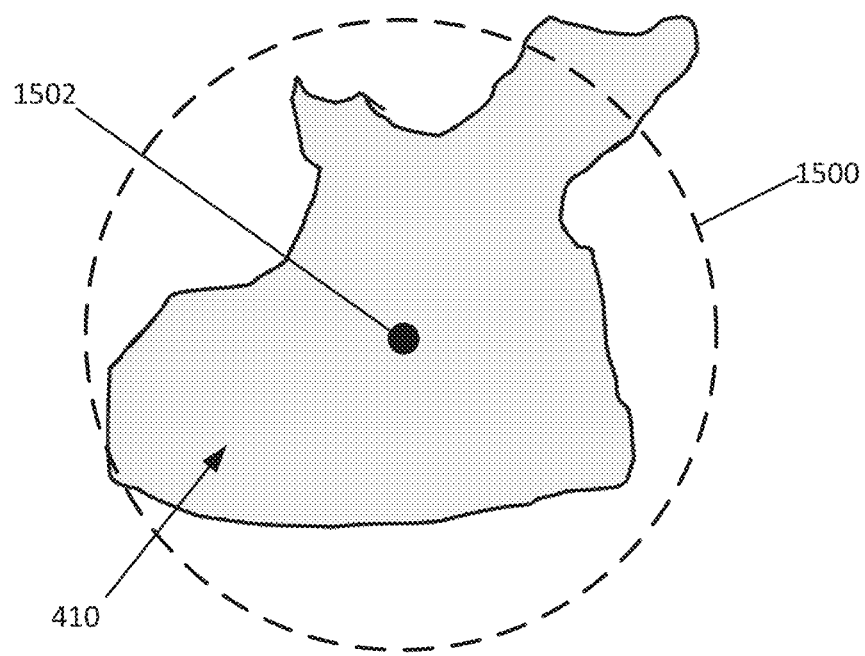

FIG. 15A illustrates an example of the detected LOI 410 have a higher blob conformity with respect to a determined ideal Hough circle 1500 generated using the image information of the detected LOI 410. FIG. 15B illustrates another example where the detected LOI 410 has a lower blob conformity with respect to the determined ideal Hough circle 1500. The ideal Hough circle 1500 is positioned over the detected LOI and may be based on the Hough circle best-fit calculation and average center hole determination, as suitably performed, such that any suitable blob conformity tool can analyze the blob (detected LOI 410) with respect to the ideal Hough circle 1500. The "blob conformity" as used herein refers to a value assigned to a cluster (blob) indicating how much the cluster conforms to a predetermined shape such as a circle with a specific radius. Any known method or tool such as machine learning algorithms for pattern recognition as well as image identification and analysis may be implemented to achieve such calculation.

As illustrative examples, the LOI 410 of FIG. 15A may have a blob conformity value of 75% conformity, and the LOI 410 of FIG. 15B may have a blob conformity value of 45% conformity. If the threshold for passing this "blob conformity test" was set at 70%, the LOI 410 of FIG. 15A would pass, and its LOI center point may be used for scoring, but the LOI 410 of FIG. 15B would fail, and the user may be asked to manually enter the score. As a point of reference, if the bullet formed a perfect circle in the target such that the dimension of the formed circle (detected LOI 410) matches the dimension of the bullet diameter, the blob conformity in such instance would be 100%. Although 70% is used as the threshold blob conformity value, any suitable value less than 100% may be implemented as the threshold.

In some examples, the system may implement a static scoring function, which may be, for example, a function of an app located or installed on the user device 206 for scoring a target. The user device 206, via the installed app, may use a camera implemented or installed on the user device 206 to capture an image. The user device 206, via the installed app, then process the image to identify the ROI and LOI using methods and processes described above, and assign a score to each shot as detected. Afterwards, the user device 206, via the installed app, may display the overall result(s). If the assigned score is incorrect, the user may manually correct the score via a user interface on the user device 206 as provided by the app. The image(s) and result(s) may be uploaded to the cloud platform such as the such as the cloud network 212 as part of a competition with other users, for example.

Advantages of implementing such shot detection and score calculation using image differentiation, circle Hough transform technique, and confidence index include an improved accuracy in the calculated shooting score as well as improved user experience for shooting ranges or shooting competitions where each target has multiple points of aim and not just a single "bulls-eye" located at its center. Also, the image differentiation process facilitates a reduction in the bandwidth of data communication between the user devices and the access point device to reduce "lags" in real-time image transmission. Furthermore, the circle Hough transform technique used in detecting the multiple ROIs in the target as well as the LOI within the detected ROI facilitates a more accurate method of shot detection than can be achieved using acoustic triangulation as known in the art, when scoring a multi-detail target. The confidence index calculation adds another layer of accuracy by allowing users to enter score manually if a detected LOI does not appear to resemble a shot made on a target, instead of automatically recording a score which may be incorrect. Furthermore, the user may design his or her own target to use in shooting practices, which can be stored in the memory of the access point device, without worrying about the need for constant re-zeroing and recalculations if a new target is used.

The embodiments of the disclosure described herein are not intended to be exhaustive or to limit the disclosure to the precise forms disclosed. Rather, the embodiments selected for description have been chosen to enable one skilled in the art to practice the disclosure.

One of ordinary skill in the art will realize that the embodiments provided can be implemented in hardware, software, firmware, and/or a combination thereof. For example, the controllers disclosed herein may form a portion of a processing subsystem including one or more computing devices having memory, processing, and communication hardware. The controllers may be a single device or a distributed device, and the functions of the controllers may be performed by hardware and/or as computer instructions on a non-transitory computer readable storage medium. For example, the computer instructions or programming code in the controller may be implemented in any viable programming language such as C, C++, HTML, XTML, JAVA or any other viable high-level programming language, or a combination of a high-level programming language and a lower level programming language.

As used herein, the modifier "about" used in connection with a quantity is inclusive of the stated value and has the meaning dictated by the context (for example, it includes at least the degree of error associated with the measurement of the particular quantity). When used in the context of a range, the modifier "about" should also be considered as disclosing the range defined by the absolute values of the two endpoints. For example, the range "from about 2 to about 4" also discloses the range "from 2 to 4."

It will be recognized that in embodiments consistent with the present disclosure, each of the various actions could be performed by specialized circuits (e.g., discrete logic gates interconnected to perform a specialized function), by program instructions, such as program modules, being executed by one or more processors (e.g., a central processing unit (CPU) or microprocessor), or by a combination of both, all of which can be implemented in a hardware and/or software of the controller, plural controllers, and/or modules, each of which can utilize a processor or share a processor with another unit (module, controller etc.) to perform actions required.

Logic of embodiments consistent with the disclosure can be implemented with any type of appropriate hardware and/or software, with portions residing in the form of computer readable storage medium with a control algorithm recorded thereon such as the executable logic and instructions disclosed herein, and can be programmed, for example, to include one or more singular or multi-dimensional engine and turbine look-up tables and/or calibration parameters. The computer readable medium may comprise tangible forms of media, for example, a random access memory (RAM), a read-only memory (ROM), an erasable programmable read-only memory (e.g., EPROM, EEPROM, or Flash memory), an optical fiber, and a portable compact disc read-only memory (CD-ROM), or any other solid-state, magnetic, and/or optical disk medium capable of storing information. Thus, various aspects can be embodied in many different forms, and all such forms are contemplated to be consistent with this disclosure.

Although the examples and embodiments have been described in detail with reference to certain preferred embodiments, variations and modifications exist within the spirit and scope of the disclosure as described and defined in the following claims.

What is claimed is:

1. An electronic target measurement system comprising:
 at least one image capture device each configured to:
  generate low-resolution image data and high-resolution image data of a series of successive real-time images of at least one target with a plurality of regions of interest (ROIs), wherein the series of successive real-time images includes a primary image and a secondary image taken at a predetermined amount of time after the primary image;
 an access point device electrically coupled with the at least one image capture device and configured, in each measurement cycle, to:
  determine whether the system is in a first mode or a second mode,
  based on whether the system is in the first mode or the second mode, receive the low-resolution image data or the high-resolution image data of the primary and secondary images from the at least one image capture device, and
  transmit to the user device the low-resolution image data in the first mode and the high-resolution image data in the second mode; and
 a user device electrically coupled with the access point device and configured to:
  display the low-resolution image data as image stream on a user interface of the user device in the first mode, perform image preprocessing on the high-resolution image data of the primary and secondary images in the second mode, determine, via an image differentiation process performed on the high-resolution image data of the primary and secondary images, that the secondary image is different from the primary image, extract the plurality of ROIs and one or more locations of impact (LOIs) from the high-resolution image data of the secondary image, determine, for each of the plurality of extracted ROIs, a ROI center point, any one of the one or more LOIs within the ROI, and a LOI center point for the corresponding LOI, determine, for the each of the plurality of extracted ROIs, a regional score based on a distance between the ROI center point the LOI center point, and determine a total score by adding the regional scores for the plurality of extracted ROIs.

2. The electronic target measurement system of claim 1, wherein the user device is further configured to use the secondary image from a current measurement cycle as a primary image in an image differentiation process of a successive measurement cycle.

3. The electronic target measurement system of claim 1, wherein the user device extracts the plurality of ROIs from the secondary image by:

applying an image correction to the secondary image, wherein the image correction includes (1) determining at least one edge of the at least one target, (2) calculating a plurality of corner locations of the at least one target, (3) transforming the secondary image based on the calculated corner locations, and (4) cropping the transformed secondary image to isolate the at least one target from a background; and determining the plurality of ROIs in the cropped secondary image by applying a circle Hough transformation to the cropped secondary image.

4. The electronic target measurement system of claim 3, wherein parameters of the image correction are automatically determined based on environmental conditions of the at least one target.

5. The electronic target measurement system of claim 3, wherein the user device extracts the one or more LOIs from the secondary image by:

cropping the determined plurality of ROIs to isolate the determined plurality of ROIs into a plurality of cropped ROI images; and determining the one or more LOIs in the cropped ROI images by applying an image threshold adjustment and the circle Hough transformation to the plurality of cropped ROI images.

6. The electronic target measurement system of claim 5, wherein the user device is configured to determine the ROI center point and the LOI center point for the each of the plurality of extracted ROIs by:

determining a plurality of ROI edges by applying the circle Hough transformation to the cropped ROI images;

determining a corresponding ROI center point based on each of the plurality of ROI edges;

determining one or more LOI edges by applying the circle Hough transformation to the one or more determined LOIs in the cropped ROI images; and determining a corresponding LOI center point based on each of the one or more LOI edges.

7. The electronic target measurement system of claim 6, wherein the user device is further configured to determine, for each of the one or more determined LOIs, a confidence index of the LOI center point by performing a blob conformity analysis on a shape of the corresponding LOI.

8. The electronic target measurement system of claim 6, wherein the user device is further configured to:

display, on the user interface, the plurality of ROI edges, the plurality of ROI center points, and the one or more LOI edges; and update the user interface to reflect the regional scores associated with the plurality of ROIs.

9. The electronic target measurement system of claim 1, wherein the user device is further configured to:

determine, based on a number of ROI center points and a number of LOI center points, that at least one of the ROIs of the target lacks a corresponding LOI associated with the at least one of the ROIs; and assign the regional score of zero (0) for the at least one of the ROIs without the corresponding LOI.

10. The electronic target measurement system of claim 1, wherein the user device is further configured to estimate, based on the secondary image, a pixel conversion rate to convert pixel values in the primary and secondary images into a physical distance measurement, and the distance between the ROI center point and the LOI center point is converted from pixel values to a corresponding physical distance measurement based the estimated pixel conversion rate.

11. The electronic target measurement system of claim 1, wherein the series of successive real-time images of the at least one target includes a series of photographs taken in intervals defined by the predetermined amount of time.

12. The electronic target measurement system of claim 1, wherein the series of successive real-time images of the at least one target includes a series of video frame images from a video data recorded by the at least one image capture device, wherein the series of video frame images are extracted from the video data in intervals defined by the predetermined amount of time.

13. The electronic target measurement system of claim 1, wherein the at least one image capture device is implemented in the user device.

14. The electronic target measurement system of claim 13, wherein the user device is configured to: display the total score; and allow a user to manually correct the total score via the user interface.

15. The electronic target measurement system of claim 14, further comprising a remote cloud platform wirelessly coupled with the user device to receive the total score from the user device.

16. The electronic target measurement system of claim 1, further comprising a remote server electrically coupled with the access point device and the user device, the remote server configured to:

receive, from a plurality of access point devices or a plurality of user devices, a plurality of total scores associated with a plurality of targets, wherein each target is remotely located with respect to each other; and transmit, to the user device, a total score associated with one of the other plurality of user devices.

17. A method for an electronic target measurement system comprising:

receiving, by a user device from an access point device, low-resolution image data or high-resolution image data of a series of successive real-time images of at least one target acquired by at least one image capture device operable to generate the low-resolution image data and the high-resolution image data in intervals of a predetermined amount of time, wherein the access point device is operable to determine whether the electronic target measurement system is in a first mode or a second mode and transmits to the user device the low-resolution image data in the first mode and the high-resolution image data in the second mode;

in response to the user device receiving the low-resolution image data in the first mode from the access point device, displaying the low-resolution image data as image stream on a user interface of the user device; and in response to the user device receiving the high-resolution image data in the second mode from the access point device,
determining that a first image from the high-resolution image data is different from a second image from the high-resolution image data of the series of successive real-time images which immediately precedes the first image;
extracting a plurality of regions of interest (ROIs) and one or more locations of impact (LOIs) from the first image;
determining, for each of the plurality of extracted ROIs, a ROI center point, any one of the one or more LOIs within the ROI, and a LOI center point for the corresponding LOI;
determining, for each of the plurality of extracted ROIs, a regional score based on a distance between the ROI center point the LOI center point; and
determining a total score by adding the regional scores for the plurality of extracted ROIs.

18. The method of claim 17, wherein the plurality of ROIs are extracted from the first image by:
applying, by the user device, an image correction to the first image, wherein the image correction includes (1) determining at least one edge of the at least one target, (2) calculating a plurality of corner locations of the at least one target, (3) transforming the first image based on the calculated corner locations, and (4) cropping the transformed first image to isolate the at least one target from a background; and
determining, by the user device, the plurality of ROIs in the cropped first image by applying a circle Hough transformation to the cropped first image.

19. The method of claim 18, further comprising:
determining, by the user device, parameters of the image correction based on environmental conditions of the at least one target.

20. The method of claim 17, wherein the one or more LOIs are extracted from the first image by:
cropping, by the user device, the determined plurality of ROIs to isolate the determined plurality of ROIs into a plurality of cropped ROI images; and
determining, by the user device, the one or more LOIs in the cropped ROI images by applying an image threshold adjustment and a circle Hough transformation to the plurality of cropped ROI images.

21. The method of claim 20, wherein the ROI center point and the LOI center point are determined by:
determining a plurality of ROI edges by applying the circle Hough transformation to the cropped ROI images;
determining a corresponding ROI center point based on each of the plurality of ROI edges;
determining one or more LOI edges by applying the circle Hough transformation to the one or more determined LOIs in the cropped ROI images; and
determining a corresponding LOI center point based on each of the one or more LOI edges.

22. The method of claim 21, further comprising:
displaying, on the user interface of the user device, the plurality of ROI edges, the plurality of ROI center points, and the one or more LOI edges; and
updating, by the user device, the user interface to reflect the regional scores associated with the plurality of ROIs.

23. The method of claim 17, further comprising:
determining, by the user device based on a number of ROI center points and a number of LOI center points, that at least one of the ROIs of the target lacks a corresponding LOI associated with the at least one of the ROIs; and
assigning, by the user device, the regional score of zero (0) for the at least one of the ROIs without the corresponding LOI.

24. A mobile device for an electronic target measurement system comprising:
a processor; and
a memory storing instructions thereon which, when executed on the processor, causes the processor to:
receive from an access point device, a series of successive real-time images of at least one target with a plurality of regions of interest (ROIs) acquired by at least one image capture device in low-resolution image data or high-resolution image data, wherein the at least one image capture device is operable to generate the low-resolution image data and the high-resolution image data of the series of successive real-time images, and the access point device is operable to determine whether the electronic target measurement system is in a first mode or a second mode and transmits to the mobile device the low-resolution image data in the first mode and the high-resolution image data in the second mode;
in response to receiving the low-resolution image data in the first mode from the access point device, display the low-resolution image data as image stream on a user interface of the mobile device; and
in response to receiving the high-resolution image data in the second mode from the access point device,
determine that a first image in the high-resolution image data of the successive real-time images is different from a second image in the high-resolution image data of the successive real-time images which immediately precedes the first image;
extract the plurality of ROIs and one or more locations of impact (LOIs) from the second image;
determine for each of the plurality of extracted ROIs, a ROI center point, any one of the one or more LOIs within the ROI, and a LOI center point for the corresponding LOI;
determine for each of the plurality of extracted ROIs, a regional score based on a distance between the ROI center point the LOI center point; and
determine a total score by adding the regional scores for the plurality of extracted ROIs.

* * * * *